US010567141B2

(12) United States Patent
Rainish

(10) Patent No.: US 10,567,141 B2
(45) Date of Patent: Feb. 18, 2020

(54) METHOD AND SYSTEM FOR SATELLITE COMMUNICATION

(71) Applicant: Satixfy Israel Ltd., Rehovot (IL)

(72) Inventor: Doron Rainish, Ramat Gan (IL)

(73) Assignee: SATIXFY ISRAEL LTD., Rehovot (IL)

( * ) Notice: Subject to any disclaimer, the term of this patent is extended or adjusted under 35 U.S.C. 154(b) by 0 days.

(21) Appl. No.: 16/026,399

(22) Filed: Jul. 3, 2018

(65) Prior Publication Data
US 2018/0316479 A1    Nov. 1, 2018

Related U.S. Application Data

(63) Continuation of application No. 15/361,281, filed on Nov. 25, 2016, now Pat. No. 10,033,509, which is a
(Continued)

(51) Int. Cl.
*H04L 5/00* (2006.01)
*H04B 7/185* (2006.01)
(Continued)

(52) U.S. Cl.
CPC ......... *H04L 5/0073* (2013.01); *H04B 7/0617* (2013.01); *H04B 7/1851* (2013.01);
(Continued)

(58) Field of Classification Search
CPC ... H04L 5/0073; H04L 43/16; H04L 43/0852; H04L 43/18; H04B 7/0617; H04B 7/1851; H04B 7/2656; H04W 72/0446
See application file for complete search history.

(56) References Cited

U.S. PATENT DOCUMENTS 5,481,561 A * 1/1996 Fang ...................... H04B 7/216
370/320
5,663,734 A    9/1997 Krasner
(Continued)

FOREIGN PATENT DOCUMENTS

| CN | 1799208 A | 7/2006 |
|---|---|---|
| CN | 101043481 | 9/2007 |

(Continued)

OTHER PUBLICATIONS

Propagation data and prediction methods required for the design of Earth-space telecommunication systems, ITU-R Recommendation Sector of ITU, Recommendation ITU-R P.618-11, Sep. 2013, pp. 1-26.

*Primary Examiner* — Kenneth T Lam
(74) *Attorney, Agent, or Firm* — Browdy and Neimark, P.L.L.C.

(57) ABSTRACT

The present invention provides communication technology (transmitter and receiver systems) for communicating data from the transmitter to one or more terminals' receivers over one or more communication channels. The communication channel is transmitted in burst communication mode such that transmission signal includes transmission data time slots at which one or more of said communication frames are encoded in the signal and one or more recess time slots between them. The communication receiver is adapted for processing signals of the burst mode communication channel and is operable for processing at least a portion of a signal received in the communication channel after a recess time period during which communication frames were not transmitted to determine a carrier frequency of the communication channel, based on a single communication frame appearing in the communication channel after the recess time period.

18 Claims, 7 Drawing Sheets

Related U.S. Application Data continuation-in-part of application No. 15/311,969, filed as application No. PCT/IL2015/000025 on May 13, 2015, now Pat. No. 10,312,997.

(60) Provisional application No. 62/001,045, filed on May 20, 2014.

(51) Int. Cl.

| | | |
|---|---|---|
| *H04B 7/06* | (2006.01) | |
| *H04L 12/26* | (2006.01) | |
| *H04W 72/04* | (2009.01) | |
| *H04B 7/26* | (2006.01) | |

(52) U.S. Cl.
CPC ............ *H04L 43/18* (2013.01); *H04B 7/2656* (2013.01); *H04W 72/0446* (2013.01)

(56) References Cited

U.S. PATENT DOCUMENTS

| | | |
|---|---|---|
| 6,463,040 B1 | 10/2002 | Dutta |
| 6,504,855 B1 | 1/2003 | Matsunaga |
| 7,035,311 B2 | 4/2006 | Nohara et al. |
| 9,143,271 B2 | 9/2015 | Hong ............... H04L 69/16 |
| 9,461,701 B1 | 10/2016 | Mitchener |
| 9,735,940 B1* | 8/2017 | Bakr .............. H04L 5/0053 |
| 2002/0054632 A1 | 5/2002 | Chuang et al. |
| 2003/0086512 A1 | 5/2003 | Rick et al. |
| 2003/0108126 A1* | 6/2003 | Akopian ............. G01S 19/29 375/326 |
| 2004/0101046 A1 | 5/2004 | Yang ............... H03M 13/15 375/240.08 |
| 2004/0114547 A1* | 6/2004 | Christodoulides ............ H04B 7/18513 370/316 |
| 2006/0176984 A1* | 8/2006 | Lee ............... H04L 7/042 375/343 |
| 2007/0085736 A1 | 4/2007 | Ray et al. |
| 2007/0126612 A1 | 6/2007 | Miller |
| 2007/0248076 A1 | 10/2007 | Ji et al. |
| 2009/0023384 A1 | 1/2009 | Miller .............. H04B 7/18513 455/12.1 |
| 2009/0285151 A1 | 11/2009 | Eidenschink et al. |
| 2010/0128660 A1 | 5/2010 | Becker ............. H04B 7/18582 370/316 |
| 2011/0032920 A1 | 2/2011 | Suberviola |
| 2011/0268017 A1* | 11/2011 | Miller .............. H04B 7/2041 370/321 |
| 2012/0207144 A1 | 8/2012 | Bouvet et al. |
| 2013/0177061 A1 | 7/2013 | Ram et al. |
| 2013/0331026 A1 | 12/2013 | O'Neill et al. |
| 2014/0226682 A1 | 8/2014 | Becker et al. |
| 2014/0369450 A1 | 12/2014 | Leyh ............... H04B 1/1027 375/346 |
| 2016/0182189 A1 | 6/2016 | Stadali .............. H04L 1/0003 370/474 |
| 2017/0104520 A1 | 4/2017 | Rainish ............. H04B 7/18513 |
| 2017/0111912 A1* | 4/2017 | Keshet ............. H04W 56/00 |

FOREIGN PATENT DOCUMENTS

| | | |
|---|---|---|
| CN | 101573891 A | 11/2009 |
| CN | 101573893 A | 11/2009 |
| CN | 101908920 A | 12/2010 |
| CN | 102461195 | 5/2012 |
| CN | 103201966 A | 7/2013 |
| CN | 103701740 | 4/2014 |
| WO | 2004/100501 A2 | 11/2004 |
| WO | 2008/000341 A1 | 1/2008 |
| WO | 2008/060758 A2 | 5/2008 |
| WO | 2008/100341 | 8/2008 |
| WO | 2012/038380 A1 | 3/2012 |
| WO | 2012038380 | 3/2012 |
| WO | 2013/188178 A1 | 12/2013 |
| WO | 2015177779 | 11/2015 |
| WO | 2013127688 | 9/2016 |

* cited by examiner

FIG.1
PRIOR ART
FIG.2
FIG.3
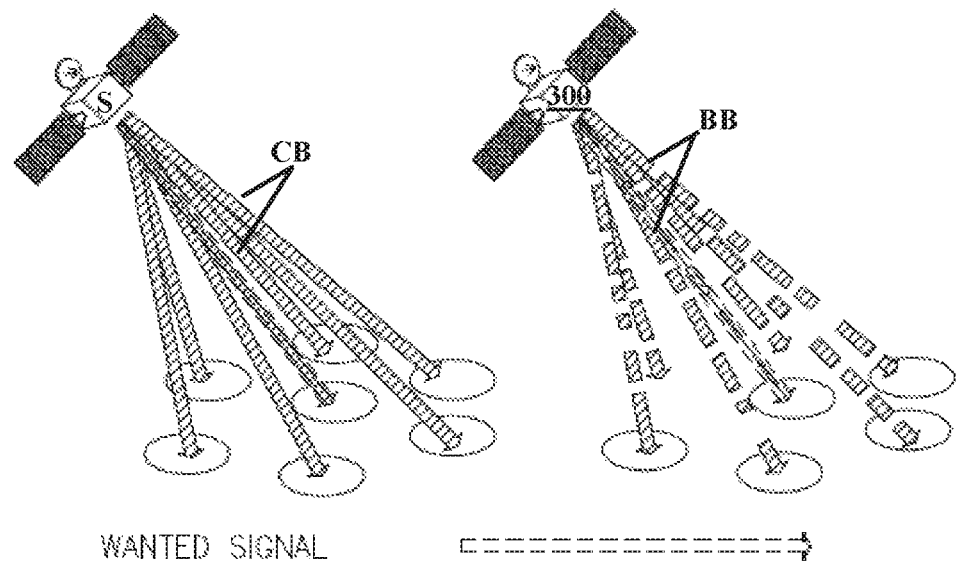
FIG.4A
PRIOR ART
FIG.4B

METHOD AND SYSTEM FOR SATELLITE COMMUNICATION

TECHNOLOGICAL FIELD

The present disclosure relates to the field of communications and in particularly to communications being held between satellites and terminals associated therewith in a satellite communications network.

BACKGROUND

Interference occurring due to transmissions sent from/to neighbor satellites, using the same frequencies as well as interference occurring due to communications transmitted along satellites beams using the same frequencies, tend to degrade the reception performance and to limit the maximal channel throughput.

Interference to communications exchanged along satellite links is one of the major factors limiting the capacity of satellite communication. Modern satellites include numerous transponders transmitting at different frequencies, different antennas (single beam or multiple beam), and different polarizations per antenna. Thus, a ground receiver of a satellite link is susceptible to interference that may arise, for example, from co-frequency transmissions at the same frequency, same beam but different polarization (co-frequency, co-beam, cross polarization), same frequency but a different beam (co-frequency, adjacent beam), and adjacent frequency channel from the same or from different beams.

As the satellite uplink receiver is also susceptible to interference, interference on the uplink may leak into the desired channel as well. Additionally, unwanted interference originating from an adjacent satellite may also occur as well as interfering signals from terrestrial sources.

Interference events may be caused by rules violations or errors made by operators. However, the effects of these events might be mitigated due to the newly established Carrier ID standard, which enables a satellite operator or regulators to identify and shut down interfering transmissions. Nevertheless, even links that operate in accordance with the operation rules and regulations may still be a source of interference.

Active interference cancellation means are available. Such means typically involve building a dedicated receiver to capture the interfering signal and then cancel it by subtraction from the wanted signal. Obviously, this technique is rather costly while perfect cancellation is never possible. Even when the interfering signal is known (which is the case when dummy frames are transmitted), cancellation requires synchronization and channel estimation of the interference, which might still require installation of additional circuitry.

GENERAL DESCRIPTION

Satellite communication it often used for broadcast transmissions, distribution and contribution links, cellular and Internet connection backhaul traffic, and/or for many other communication purposes. According to the conventional satellite communication techniques, a large part of the communication traffic transferred via satellites, is communicated over continuous transmission channel/link, in which non information coded transmission signals are transmitted in the time gaps between information coded transmission section of the transmitted signals. The conventional use of continuous transmissions (where gaps between sections of information coded signals are filled with non-information coded signals) non information coded transmission signals) is aimed at obviating a need for receivers, to re-acquire and re-synchronize to separate transmission bursts of information coded signals. In other words, such continuous transmission mode enables the receiver to track the various transmission parameters relatively in a straightforward operation.

Therefore, satellite communications' standards, such as DVB-S2 and DVB-S2X define a continuous transmission mode of operation in the forward link (transmissions being sent from the satellite(s) towards the terminals), and define that whenever the (hub) transmitter has no data to transmit, "dummy frames" will be transmitted, which contain no information.

It should be understood that the terms beam and/or communication-beam is used herein to designate a beam of transmitted electromagnetic (EM) waves (typically of a radio frequency), which is directed (optionally by suitable antenna module) and/or constructed by beam forming (e.g. utilizing beam former and phase array antenna) to propagate to cover a certain designated region of interest. In beam hopping operation mode multiple such beams may be continuously or discontinuously be transmitted from the satellite whereby the data bandwidth directed to different coverage regions may be dynamically allocated by hopping one or more of the beams from one coverage zone to another (e.g. in a time interlaced fashion) so that multiple zones can be served by a lower number of coexisting simultaneously transmitted beams via a time domain dynamic beam allocation to zones.

The terms channel and/or communication-channel and/or link and/or to communication-link are used herein interchangeably to designate a communication channel formed between the satellite and one of the terminals it serves. Typically, each beam simultaneously carries one or more communication channels to one or more terminals in the zone covered thereby.

Indeed, not all of the traffic being exchanged between the satellite and the terminals served thereby, requires the use of strictly continuous communication mode (e.g. the latter is hereinafter also referred to as continuous communication links/channel). Interactive communications for example, are bursty by nature, and an assembly of such links forms links of non-constant rate. Depending on the specific statistics of the link, there is typically a significant difference between the allocated bandwidth of a link, which is typically determined by the difference between the peak information rate for transferring the information to the average information rate that can be supported. The dummy frames, used in the continuous communication mode (e.g. by the DVB-S2 and DVB-S2X standards) are used in order to compensate for this difference.

One deficiency of the conventional techniques using the continuous transmission modes is that the transmission of the dummy frames create unnecessary interference to adjacent beams and satellites, and as a result reduces the signal to noise and interference ratio (generally referred to herein as SINR) of the transmitted signal which in turn has an adverse effect on the effective data rate which can be received by the receivers.

Another deficiency of the continuous transmission mode, is associated with the inefficient allocation/distribution of the total data bandwidth of the satellite/transmitter. This is because in this continuous mode of transmission, certain of the data bandwidths is allocated for transmitting the dummy frames which actually carry no data (no meaningful data), and this may result in a lower number of communication channel/beams as would have being possible in cases where non continuous transmission mode (no dummy frame transmission) is used. In other words, in case burst (non-continuous) transmission mode is used, the transmission time, during which the dummy frames are communicated in the continuous mode, might instead be allocated for the transmission of one or more additional beams/channels/links and thereby facilitate coverage of additional zones and/or allocating larger data bandwidths to each beam/zone. Accordingly in this manner a beam hopping system whereby transmission resources are used to serve different zones by different beams may be facilitated.

Yet additional adverse effect of the continuous transmission mode is that it results with an increased consumption of the transmission power, as compared to the case dummy frames are not transmitted, whereby energy is typically a valuable resource in satellites, in particular in micro- or nano-satellites.

Nevertheless, conventional satellite communication techniques are implementing continuous transmission mode, in which dummy frames (and/or other dummy transmission sections which do not encode any meaningful/required information) are transmitted in the time gaps between information coded transmission sections. This is made in order to facilitate efficient acquisition of the transmitted signal to be received, by the signal receivers (satellite terminals) that should receive the signal.

Indeed a bursty communication mode, in which no signal is transmitted in the time gaps between transmissions of information coded signal sections, may result in much more efficient communication in terms of SINR (signal to interference and noise), data bandwidth, beam hopping coverage, and energy consumption.

However, conventional satellite communication techniques, such as DVB-S2 and DVB-S2X standards, generally use the continuous communication mode. This is because the conventional receivers used in satellite communication, require significant time and resources to acquire (perform signal acquisition) and possibly synchronize to each communication burst of the separated communication bursts provided by the bursty communication mode. More specifically as will be explained in more details below, a receiver configured according to the conventional technique would require to receive at least two, and typically more than two, communication frames in order to lock-on-to (acquire) the signal, which is to be received thereby. More specifically, conventional receivers require a significant amount of time, extending over several/plurality of communication frames in order to analyze the signal, to scan over the possible carrier frequency of the signal, until the correct carrier frequency is determined, and the signal is acquired. This results with the effective loss of several communication frames after every discontinuity in the transmitted/received signal, which in turn makes the use of burst communication mode impractical/inefficient with the conventional receivers.

In this regard it should be noted that the term communication frame is used herein to designate a section (time portion) of a transmitted (EM) signal including a header part (typically encoding data indicative of at least the parameters of the physical layer of the communication) and a data payload part, in which the actual data that should be communicated to the receiver is encoded. Optionally the communication-frame further includes additional sections, such as pilot sections and/or other. A dummy frame, is used herein to designate a communication frame in which the transmitted data section of the signal does not encode any useful information for the receiver. A data coded frame, is used herein to designate a communication frame in which the transmitted data section of the signal encodes information useful for the receiver/terminal (e.g. payload data).

Therefore, it is an object of the present invention to provide a method for reducing interference occurring due to transmissions sent from/to neighbor satellites using the same frequencies and/or interference occurring due to communications transmitted along satellites beams using the same frequencies.

It is another object of the present invention to provide a method that relies on peak to average information rate difference, e.g. transmission of dummy frames, for reducing interference to the air interface operation.

It is another object of the present invention to provide a methods and systems for highly efficient beam-hopping transmissions with reduced transmission overhead and interferences and/or possibly with optimize transmission priorities.

Other objects of the present invention will become apparent as the description of the invention proceeds.

According to one broad aspect of the present invention there is provided a communication transmission system including: a data provider configured and operable for providing data to be communicated to one or more terminals over one or more forward communication channels; a communication frames generator module configured and operable to segregate the data into a plurality of data payload portions to be communicated to at least one terminal of the terminals over at least one forward communication channel of the forward communication channels and generate a sequence of communication frames to be sequentially transmitted over the communication channel (each communication frame including a header portion and a data payload portion); and a transmission channel signal encoder configured and operable for generating a transmission signal for transmission via the forward communication channel with the sequence of communication frames encoded in the signal. According to the technique of the present invention the transmission channel data encoder is configured and operable in burst communication mode such that transmission signal includes transmission data time slots at which one or more of the communication frames are encoded in the signal and one or more recess time slots between them.

In some embodiments the communication transmission system also includes a transmission module configured and operable for transmitting the transmission signal in burst communication mode such that during the recess time slots no signal is transmitted.

In some embodiments the communication transmission system is configured and operable in a multi-beam mode for transmitting a plurality of beams having different respective geographical coverages. Each communication channel of the one or more forward communication channels is associated with at least one beam of the beams and designated for one or more terminals residing in a geographical coverage of said at least one beam. For example the system may be configured and operable in a beam-hopping mode, such that two or more groups of beams, each including at least one of the plurality of beams, are transmitted at distinct time intervals.

In some embodiments the communication transmission system includes a transmission scheduler module configured and operable for scheduling transmission of the two or more groups of beams. In some cases the transmission scheduler module is configured and operable for scheduling the transmission data time slots of the communication frames of the at least one forward communication channel of each group of beams is transmitted, so as to aggregate a plurality of recess timeslots together to form a prolonged recess time slot at which different group of one or more of the beams can be transmitted.

In some embodiments the transmission scheduler module is configured and operable in a dynamic scheduling mode for assigning dynamically determined time durations to the transmission of each beam during a beam hopping operation. According to yet another broad aspect of the present invention there is provided a communication receiver module adapted for processing signals of a burst mode communication channel from a remote communication system. The communication receiver is configured and operable for processing at least a portion of a signal received in the communication channel after a recess time period during which communication frames were not transmitted in said communication channel to determine a carrier frequency of the communication channel, based on a single communication frame appearing in the communication channel after said recess time period.

According to additional broad aspect of the present invention, a method is provided for reducing interference to transmissions that occur due to other transmissions sent from/to neighboring satellites utilizing the same frequencies and/or interference that occur due to other communications transmitted along different satellites beams using the same frequencies, wherein the method comprises the step of replacing full dummy frames that should be transmitted in a TDM continuous satellite forward channel, with dummy frames' headers.

The term "same frequencies" as used herein throughout the specification and claims is used to denote the exact same frequencies, or frequencies that are sufficiently close to the transmission frequencies, thereby causing interference to the communications transmitted at the transmission frequencies.

According to another embodiment, the method provided further comprising a step of inserting at least one pilot sequence at least one gap formed when a full dummy frame associated with the dummy frame's header and comprises a respective payload, was replaced by a dummy frame's header.

In accordance with another embodiment, dummy frame's header is transmitted at a reduced power. Also, if at least one pilot sequence has been inserted at the at least one gap formed, it will be transmitted at a reduced power.

By yet another embodiment, the method provided further comprising a step of inserting dummy frames at least one of the satellite's transmission beams, when there is data available for transmission along that at least one beam.

In accordance with another embodiment of this invention, the timing of the dummy frames is optimized so that the system performance is enhanced (e.g. the system throughput is increased). To this end, in a multi beam system, the transmitting timing of dummy frames, dummy frames headers or dummy frames headers and pilot signals in each beam, is controlled in such a way that the inter-beam interference is minimized (at the cost of some additional delays). That is, dummy frames would be inserted in transmissions conveyed along a beam, even if this beam's queue is not empty, in order to reduce interference to a certain frame or frames being transmitted along another beam or beams. The decision on whether to insert a dummy frame, and thus delaying transmission of a frame, may depend on that frame time sensitivity or other quality of service parameters associated therewith.

According to prior art protocols, dummy frames are transmitted only when there is no data to send. In accordance with another embodiment of the present invention, dummy frames, dummy frame headers or dummy frames headers and pilot signals are inserted at some of the beams (preferably at those that are less occupied with communications), also when there is data to send in order to reduce interference to other beams, at a cost of delaying the data frames.

According to another aspect of the disclosure, there is provided a receiver configured for use in a satellite communications network, wherein the receiver is configured to receive communications wherein full dummy frames that should have been transmitted in a TDM continuous satellite forward channel, were replaced with dummy frames' headers.

In accordance with another embodiment of this aspect of the disclosure, the receiver is further configured to receive communications in which at least one pilot sequence was inserted at least one gap formed when a full dummy frame associated with that dummy frame's header and comprises a respective payload, had been replaced with the dummy frame's header.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1 illustrates a prior art transmission sequence of communications in a satellite network;

FIG. 2 demonstrates one embodiment of the solution provided by the present invention whereby only the header of dummy frames are transmitted together with pilot signals, instead of full dummy frame's payload;

FIG. 3 demonstrates another embodiment of the solution provided by the present invention whereby only the header of dummy frames are transmitted instead of the full dummy frames;

FIG. 4A demonstrates a standard complying system (prior art) where no dummy frames are inserted at any of the beams when there is data to send along these beams;

FIG. 4B illustrates yet another embodiment of the solution provided by the present invention whereby dummy frames are inserted at some of the beams also at times when there is data to send along these beams;

DETAILED DESCRIPTION OF EMBODIMENTS

Figure 4C:
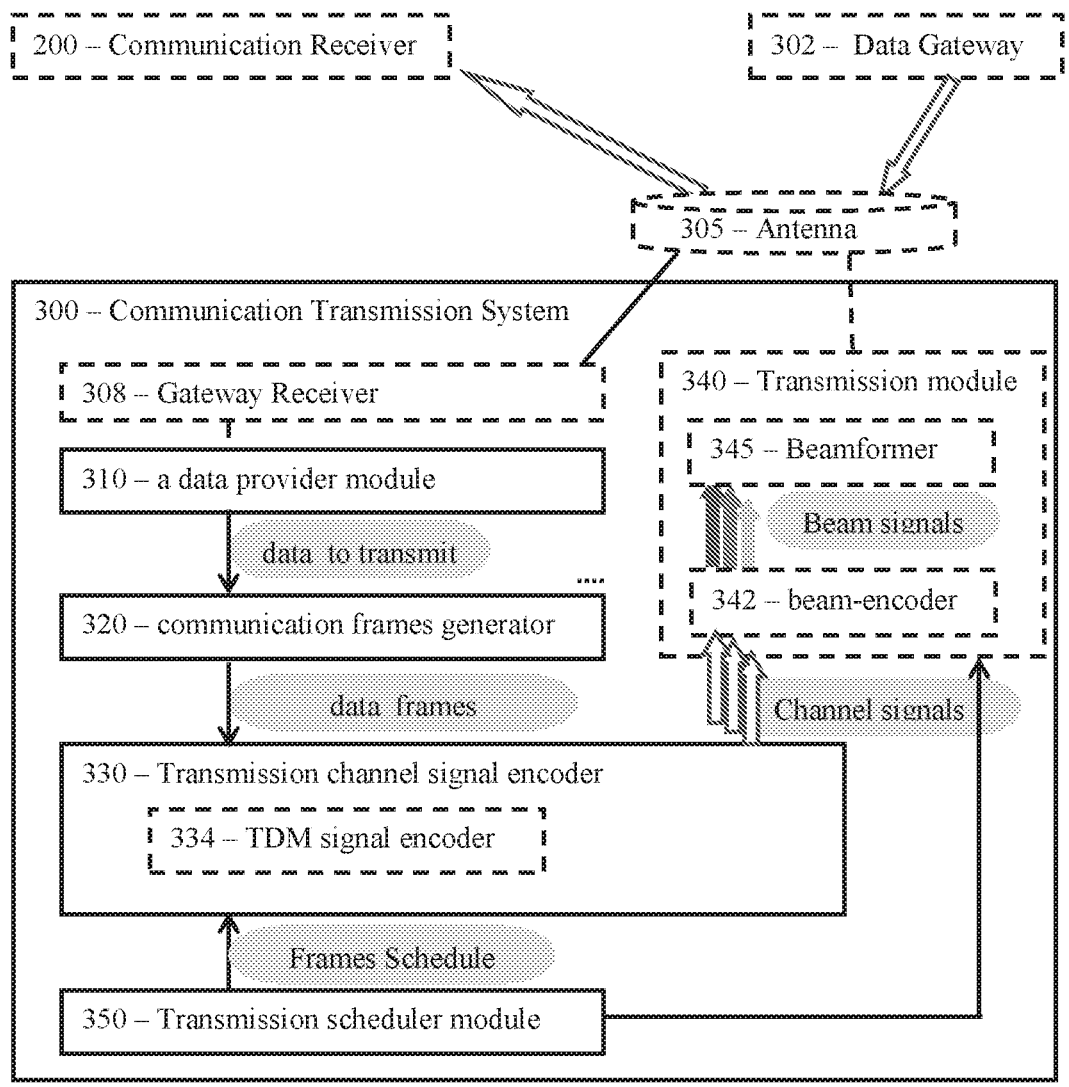
FIG. 4C is a block diagram showing a communication transmission system configured according to an embodiments of the present invention.

In the following description, for the purposes of explanation, numerous specific details are set forth in order to provide a better understanding of the present invention by way of examples. It should be apparent, however, that the present invention may be practiced without these specific details.

In the description below, for some specific not limiting examples, of the use of the technique of the invention for particular protocol/standards such as DVB-S2 and in DVB-S2X Standards, the following terminology is at times used, and may be interpreted as follows with respect to these specific examples. However, it should be understood that for the general concept of the invention relating to general signal communication, these terms should be interpreted broadly in accordance with their general/functional meaning in the field.

DVB-S2/DVB-S2X Standard (EN 302 307, Part I and Part II)

Dummy frames' insertion is a common practice for all modes of operation of the DVB-S2 and DVB-S2X standard, except for broadcasting with constant coding and modulation (CCM). The standard foresees that inserting dummy frames for obtaining a rate matching between the allocated bandwidth (allocated transmission rate) and the actual transmission rate, is necessary. Dummy frames are inserted when data is not available at the input of the transmitter. A dummy frame is a relatively short frame (having a length of between 3330 to 3510 symbols), which comprises a header of 90 or 180 symbols, and 3240 pre-determined symbols instead of data. It may also include 72 symbols of pilots, which are also known symbols transmitted within each frame to facilitate synchronization and channel estimation. A typical DVB-S2/S2X frame varies in size between 3240 to 33720 symbols, and includes a header, data and pilot symbols. The frame size depends on the type of modulation selected, while the actual symbol rate is determined by the allocated bandwidth for the link.

Calculation of Excepted Improvement of Link Performance

According to an embodiment of the present disclosure, dummy frames are transmitted while using a reduced transmission power.

Let us consider now the link associated with the interfering signal. The operational signal to noise plus interference ratio (SINR) of that link, which is required to decode the data, is higher than that required to acquire and decode the header and extract synchronization and channel parameters needed for the receiver. Thus, reducing the transmission power for transmitting a dummy frame, and even reducing the power for transmitting dummy symbols down to zero, would have no adverse effect on the performance of that link. Also, it should be appreciated that avoiding transmission of part of the dummy frame and/or reducing the power at which the dummy frames' headers, the pilot sequence (if available) or both, would require a somewhat different (more complex) receiver for carrying out the present invention than the typical receiver, commonly used nowadays.

Random Links

Let us now consider a case where a link operates in an environment of L interfering links, each associated with an average to peak information rate of $\rho_l$ ($\rho < 1$), l=1, . . . , L. Assuming that all links transmit continuously. The SINR experienced by a link is given by:

$$SINR = \frac{S}{N + \sum_{i=l}^{L} I_l}$$

Where S is the received signal power, N is the noise power and $I_l$ is the interference power received from the interfering link. The received signal power, S, is in fact a random variable since the channel may undergo fading, so $SINR_0$,—the operational SINR, is determined by its statistics, which is measured or taken from ITU-R Recommendation No. P. 618 entitled "Propagation data and prediction methods required for the design of Earth-space telecommunication systems", September 2013.

Now, let us consider a case where power reduction for transmitting dummy frames is implemented. In such a case, a fraction $\rho_l$ of the time, link l will be transmitting in full power and cause interference of $I_l$ to the link of interest, while for 1-$\rho_l$ of the time it will transmit with reduced power and the interference caused thereby will be reduced to $\alpha I_l$, $\alpha < 1$. In other words, the power of interference caused by such a link, may be described as multiplied by a stochastic variable with binomial distribution.

$$\tilde{I}_l = X_l I_l$$

$$Pr(X_l = x) = \begin{cases} \rho_l & x = 1 \\ 1 - \rho_l & x = \alpha \end{cases}$$

The total interference is thus given by:

$$\sum_{i=l}^{L} \tilde{I}_l = \sum_{i=l}^{L} X_l I_l < \sum_{i=l}^{L} I_l$$

The total interference is a random variable. Its exact statistics may depend on a number of parameters such as the number of interfering signals, their relative strength, the different average to peak ratio per link, and whether they are correlated (namely, if there is a correlation among dummy frames transmission times). However, similarly to the approach taken while considering the signal fluctuations, one can measure or estimate the margin required, when considering also the fact that the interference is to reduced.

Controlled Links

In case where all links are controlled by a central entity, (e.g. a scheduler), the stochastic process described hereinabove may be made more deterministic, and in this case, some maximal interference level may be ensured with high probability. For that purpose, the scheduler will transmit dummy frames (reduced power, header and pilots only) instead of frames which, according to their QoS requirement, can be delayed.

FIG. 1 illustrates a prior art transmission sequence/channel of communications in a satellite network, where full dummy frames are transmitted between communication frames, when data is not available at the ingress of the transmitter. The purpose of inserting these dummy frames is to achieve a rate matching between the allocated bandwidth for transmission and the actual transmission rate.

FIGS. 2 and 3 illustrate two non-limiting examples of communication channel CH transmitted by the transmission method according to certain embodiments of the present invention. The communication channel shows two transmitted communication data frames encoded in the channels signal, Data Frame i and Data Frame i+1, whereby the signal is transmitted over a communication channel with a recess time slot R between the communication of certain consecutive data frames thereof Data Frame i and Data Frame i+1.

During the recess time slot R no signal, and/or signal with substantially reduced power is transmitted over the communication channel. Optionally only dummy frame header(s) H and/or optionally pilot signals P are transmitted instead of a full dummy frame's payload (DD in FIG. 1). To this end, In the example illustrated in this FIG. 2, two optional pilot signals P are illustrated to be inserted during the interval at which the dummy frame's payload data DD would have been transmitted if the prior art protocol illustrated in FIG. 1, were to be followed). FIG. 3 demonstrates a case whereby only an optional header H of dummy frames are transmitted, instead of the full dummy frames. It should be understood, and also discussed below that actually both the dummy frame headers H and/or pilot signals P are optional and may be used to provide certain consistency/computability (to some degree of efficiency) with conventional continuous mode receivers.

FIG. 4A illustrates a conventional satellite multi-beam technique in which the satellite's S transmitter transmits a plurality of continuous mode communication beams CB simultaneously to cover different geographical regions. FIG. 4B, illustrates a multi-beam technique according to the present invention, in which the satellite's transmission system 300 configured and operable according to the technique of the present invention, (as described in more details below with reference to FIG. 4C) transmits a plurality of burst mode communication beams BB for covering a plurality of geographical regions. Each burst communication beam may include a plurality of communication channels communicated to the respective geographical regions it covers. According to this embodiment of the present invention, recess time slots (R in FIGS. 2 and 3 e.g. which may be truncated dummy frames in which the dummy payload is not transmitted) are inserted at some of the beams also at times when there is data to send along these beams. This is as opposed to a conventional standard complying system illustrated in FIG. 4A.

Optionally as will be described with reference to the scheduler module 350 below, the timings of the recess time slots of different communication channels may be arranged by the scheduler so as to accommodate transmission of additional burst mode communication beams BB, (e.g. more than possible by the conventional continuous mode communication techniques). This may be achieved for example by dynamic scheduling of the communication frame transmission in each of the beams and/or communication channels thereof.

FIG. 4C is a block diagram showing a communication transmission system 300 (satellite communication system) configured and operable according to an embodiment of the present invention. The system 300 includes a data provider module 310 configured and operable for providing data to be communicated to one or more terminals (communication receivers) over one or more forward communication channels, a communication frames generator module 320 configured and operable to segregate the data into a plurality of communication frame data payload portions, and a transmission channel signal encoder 330, configured and operable for generating/encoding the communication frames in a transmission signal to be transmitted via the forward communication channel(s).

According to the technique of the present invention, the transmission channel data encoder 330 is configured to operate in burst communication mode (or in other words is capable of operating in a non-continuous transmission mode), in which the transmission over the forward communication channel may include bursts of signal transmission (i.e. occurring during a certain statically or dynamically determined transmission time slots), in which a signal encoding one or more of the communication frames is transmitted, and one or more recess time slots between the transmission bursts (between some or all of the transmission time slots), during which no signal is transmitted over the channel, or possibly a signal of substantially reduced power is transmitted.

Accordingly, in some embodiments of the present invention the system also includes a transmission module 340 configured and operable for transmitting the transmission signal in burst communication mode. For instance in some embodiments of the present invention the transmission module 340 is adapted for transmitting the encoded signals of the communication channels, beams in a time-division multiplexing (TDM) transmission. A person of ordinary skill in the art will readily appreciate the configuration and operation of a transmitter module operative according to the TDM scheme.

The transmission module 340 may be adapted to operate during the transmission time slots associated with a respective communication channel for transmitting the communication frames of the respective communication channel during the these transmission time slots, and recess from transmitting signals associated with the respective communication channel during the recess time slots.

Accordingly, during the recess time slots no signals pertaining to the respective communication channel are encoded/transmitted by modules 330 and/or 340, or possibly in some cases only a residual signal (e.g. which includes only headers and pilots comprising predetermined code words) with significantly reduced power is transmitted (e.g. which average power is reduced for example to not more than 0.1% of the power of the signal in the transmission time slots) at least as compared to the power of the signal transmission during the transmission time slots. This is possible because headers and pilots (which typically encode sequences including at least one of certain predetermined/known key-words and which may therefore be detected by convolution with the keywords) can be detected with SNR as low as −2 dB, if, for example, a DVB-S2 waveform is used. This is as opposed to data payload portions of the signal, which generally encode un-known symbol sequences pertaining to un-known data, and therefore require much higher SNRs, as high as 30 dB, in order to be received accurately and reliably. Therefore, the header and/or pilots, in cases where they are used, can be transmitted with down to about 1/1000 of the power used for transmitting data carrying positions of the signal.

This is an extreme example as the received signal strength may limit effective SNR to a level as low as 5 dB. In this case the reduced power of the residual header and pilot signal could go down to 20% of the data power. In each case the total interference power to other beams is reduced as described above, while receivers which are not capable for burst reception can still be supported. In a beam hopping scenario where a recess gap in one beam transmission is used for transmission to other beams, it is not possible to transmit reduced power header or pilots in one beam simultaneously with other beams. Hence in this case only receivers capable of burst reception are supported.

To this end, the technique of the present invention obviates a need for transmitting dummy frames and/or dummy payload data in between the actual communication data frames which are transmitted over the communication channel. This is achieved by operating in burst communication mode for transmitting the required data communication frames during certain transmission time slots while not transmitting on that channel during the recess time slot between them.

This has several advantages over conventional continuous mode communication techniques, as follows:

(i) Reducing the interference between transmission channels and/or transmission beams, particularly in cases where the channels/beams overlap in time and are proximal/overlap in frequency and/or in their geographical coverages (distance between them). This may in-turn yield higher signal to noise/interference ratio(s) (SINR) when receiving the signal of the transmitted communication channel and therefore permit encoding data higher data rates in the communication channel, while using the same frequency-band (e.g. as supported for example by information theory considerations, for example the Shannon-Hartley theorem).

(ii) Enabling efficient allocation/distribution of data bandwidth, of the total data bandwidth available by the transmission system 300 (e.g. available to a communication satellite), to a plurality of communication channels and/or communication beams. In other words this permits to allocate higher number of communication channels and/or more beams based on the same resources of the satellite, since the waste of bandwidth on transmission of dummy frames and/or dummy data payloads is reduced. As will be further clarified below, this advantage of the technique of the present invention, is further enhanced in embodiments of the invention in which a scheduler 350 is employed for carrying out dynamic allocation (e.g. per demand) of transmission time, and hence of dynamic allocation of data bandwidth to different communication channels/beams served by the satellite.

(iii) Additional advantage of the technique of the present invention, is that it yields a much more optimized energy consumption scheme since, no/less energy is consumed on transmission of dummy/unneeded data.

To this end, according to some embodiments of the present invention the transmission channel signal encoder 330 is configured and operable for introducing one or more recess time slots in between the one or more of the communication data frames which are encoded in each channel/beams, so as to encode the data frames in the communication channel in a burst communication mode. Here, generally no dummy payload data (DD in FIG. 1) is introduced to the communication channel/beam. In some embodiments the transmission channel signal encoder 330 is configured and operable for encoding the communication time frame in a time-division multiplexing (TDM) scheme in the communication channel signal(s) it generates. To this end, the transmission channel signal encoder 330 may optionally include a TDM signal encoder module 334 configured and for applying time-division multiplexing to the data to be encoded in the channels signal. Time-division multiplexing techniques and various configurations of TDM signal encoders are generally known to those versed in the art, and for conciseness will not be repeated here.

However, as also indicated above, coping with the burst communication mode of the present invention may be difficult for conventional communication receivers which are operable in continuous communication mode. This is because during the recess time periods, at which no signal is transmitted, such receivers may lose synchronization with the communication channel and/or dis-acquire the channels' carrier frequency (e.g. due to differences in the internal clocks of the receiver and transmitter), and therefore may require prolonged time extending over several communication frames to re-acquire and/or re-synchronize with the signal of the communication channel once it re-appears after a recess time slot/period.

One way to mitigate this problem according to the present invention, is by using novel communication receiver configuration, which is configured to operate/receive signal from a burst mode communication channel. Such a receiver will be complementary with the transmission system 300 operating in a burst communication mode. The configuration and operation of such a communication receiver 200 according to some embodiments of the present invention are discussed in more details below with reference to FIGS. 5A to 6C. More specifically, the communication receiver 200 of the present invention is adapted to receive bursts of communication signals from a remote communication system (e.g. from the transmission system 300), and for processing at least a portion of a signal received in communication channel during each burst, after a recess time period during which communication frames were not transmitted in said communication channel, to determine a carrier frequency of the communication channel, based on a single (e.g. first) communication frame appearing in the communication channel after the recess time period. This facilitates implementation of an efficient burst mode communication between the transmission system 300 and the complementary receiver 200 since the receiver does not require several frames to lock-on to the signal of the communication channel after the recess time, but actually locks on to it from the first communication frame it receives; e.g. based on any one or more predetermined code words (unique sequences) which may appear on the header of that communication frame. Accordingly, practically no data bandwidth and/or no time delay is wasted/invested in the re-acquisition of the signal after the recess time periods of the burst communication mode. This makes the communication by the complementary transmission system 300 and communication receiver 200 highly efficient in terms of the data rates/bandwidth, energy consumption and interference between channel.

Alternatively, or additionally, another way for mitigating this problem, in cases where one or more conventional receivers, operating in continuous communication mode are also "listening" and should receive the communication channel signals from the transmission system 300, is by shortening the durations of the effective recess times at which no signal is transmitted in the communication channel. To this end, according to some embodiments the transmission channel signal encoder 330 is further configured and operable for introducing one or more intermediate/additional communication sequences into the signal of the communication channel, so as to practically shorten the durations at which no signal is transmitted over the communication channel to be below a certain predetermined maximal duration. More specifically, in some embodiments/implementations/scenarios the transmission channel signal encoder 330 of the present invention is adapted to encode, a recess header data sequence H (also referred to herein above as dummy frame' header) in the signal of the communication channel. The duration of the recess header data sequence H shortens the effective time of the recess time slot between the communication frames preceding and proceeding it. Typically, such recess header data sequences may be encoded at respective recess header time slots preceding respective recess time slots. This is illustrated for example in FIGS. 2 and 3 above in which the optional recess header data sequences H in the channel are illustrated. Alternatively or additionally, in some embodiments/implementations/scenarios the transmission channel signal encoder 330 of the present invention is adapted to encode one or more (optional) pilot sequences P within the time duration of the recess time slots of the signal of the communication channel, so as to practically split the recess time slot to several parts which durations does not exceed the certain predetermined maximal duration. This is illustrated for example in FIG. 2 above in which the optional pilot sequences P in the channel are illustrated.

Accordingly, in any of the above techniques, whether by introducing recess-header sequences and/or pilot sequences, or both, to the channel's signal, the transmission channel signal encoder 330 may be configured and operable such that the durations at which no signal is transmitted over the communication channel is below a certain predetermined maximal duration, whereby this certain predetermined maximal duration sets up a threshold limit above which, statistically, the signal (and/or it carrier frequency and/or its synchronization) are not expected to be lost by the receiver (except maybe to extreme/rare cases), even if the receiver would be operating in the conventional continuous communication mode. The predetermined maximal duration threshold may generally be selected according to the bandwidth of the communication and the specified stabilities of the clocks' (e.g. internal-oscillators') used in the communicating transmission system 300 (transmitter 340) and communication receiver(s) 200 (or terminal(s) 100) which exchange the communication of that bandwidth.

The transmission channel signal encoder 330 may be configured and operable for introducing recess header data sequences H and/or pilot sequences P in to the recess time slots (at the beginning and/or middle thereof) in every case where total time duration of the recess time slots exceed this predetermined threshold. Optionally, the recess header data sequences H and/or pilot sequences sequence P may be encoded with predetermined code words identifiable by the receivers, so that to allow the receivers to maintain synchronization with (e.g. update-the/retune-to) the carrier frequency and/or timing of the communication channel. Optionally, in some embodiments the transmission module 340 is configured and operable for transmitting the recess header data H and/or said pilot sequences P is with reduced power as compared to the power of the signal transmission during said data time slots.

As indicated above, in some embodiments of the present invention the transmission system 300 is configured and operable in a multi-beam mode for transmitting a plurality of beams having different respective geographical coverages respectively. In this case, each communication channel of the one or more forward communication channels may be is associated with at least one beam of the plurality of beams, and designated for one or more terminals residing in a geographical coverage of the beam.

The phrases beam and/or communication beam is used herein to designate a transmission beam of electromagnetic (EM) radiation (typically radio frequency), which is transmitted by the transmission system 300 towards (to cover) a certain predetermined geographical coverage area. A beam may be for instance formed by the directional properties of the antenna 305 to which the transmitter 340 is connected and through which the signal is transmitted, and/or it may be controllably formed to be controllably/adjustably directed to cover predetermined geographical area by using a beam former module. Such a beam former 345 is optionally included in the transmitter, and can be operated with the configuration of antenna 305 as a phased array antenna including a plurality of antenna elements. To this end, the beam former 345 may be adapted to receive the signal(s) of the communication channels that are to be transmitted by each beam (e.g. the signals here may be being a sequence of data frames associated with the respective communication channels to be included in the beam), generate therefrom a plurality of corresponding elemental signals to be transmitted by respective elements of a phased array antenna (e.g. 305) with the phases and possibly frequencies of such elemental signals being adjusted such that the beam carrying the signals of the one or more channels is directed to cover a predetermined geographical location, to which the respective channels should be transmitted. Indeed, the principles of beam forming are generally known to persons of ordinary skilled in the art and should not be repeated here, except for stating that the technique of the present invention may use beamforming for generating/transmitting one or more groups beams for covering different geographical areas, whereby each group of beams may include one or more beams that can be simultaneously formed by the beam-former 345 and simultaneous transmitted by the transmitter 340 (via antenna 305) to concurrently cover several geographical areas.

In this connection, it should be noted here that the phrase communication channel is used herein to designate a data stream (typically burst/non-continuous data stream of data) which is communicated from the transmission system (e.g. of a satellite) to one or more communication receivers (e.g. being terminals adapted to receive data from the satellite). The communication channel is generally formed as a plurality of data frames designated (e.g. by parameters encoded in their headers and/or by predetermined timings thereof and/or by their respective frequencies) to be received by certain on or more communication receivers (e.g. terminals), listening the forward communication channel from the satellite.

Since the number of beams, which can be simultaneously transmitted (e.g. which belong to the same group), as well as their widths (angular extent) and their respective directions, may be limited by certain known beamforming/beam former 345 limitations (which will be readily appreciated by those verse in the art), the present invention facilitates the transmission of plurality of groups of beams at distinct time schedules for each groups so as to accommodated broader geographical coverage.

In this connection it should be understood that according to the technique of the present invention the signals of each transmitted beam may include, or be composed of, the signals of one or more communication channels. To this end, the transmitter module 340 may include a beam encoder module 342 configured and operable for receiving, from the transmission channel signal encoder 330, the signals (e.g. the encoded communication data frames) of a plurality communication channels, in association with the communication beam(s) BB over which each of the communication channels should be transmitted, and process the encoded communication data frames of channels that are associated with each respective beam to form a unified beam's signal encoding all these communication data frames of the channels participating/transmitted in the respective beam. For example, in some embodiments the beam encoder module 342, is adapted to encode the communication frames of the plurality of communication channels which are to be transmitted in each beam, in a time division multiplexing, in the beam's signal. Alternatively or additionally, in some embodiments the beam encoder module 342, is adapted to encode the communication frames of the plurality of communication channels which are to be transmitted in each beam, in a frequency division multiplexing, in the beam's signal. Yet alternatively or additionally, other techniques for multiplexing the plurality of channels on the same beam may be employed by the beam encoder module 342, Then, in case beamforming is used for directing the beam(s) to specific/predetermined coverage areas, the beam signal (in cases where the beam encoder module 342 is used), or the signals of the communication channels (as obtained from the transmission channel signal encoder 330) may be further processed by the optional beam former 345 to generated a beam formed signal of the beam which is then transmitted in directional manner via antenna 305 (being phase array in this case). Indeed, groups of a plurality (one or more beams) may be simultaneously generated ant transmitted.

Indeed, the number of simultaneous beams that can be transmitted may be generally limited by the properties of the beam former (and/or the number of antenna elements used), as well as by the bandwidth of the system. Therefore, in order to further exploit the available resources of the transmission system 300, with improved efficiency in some embodiment of the present invention the transmission system 300 is configured and operable for operating in a beam-hopping mode. In this mode, that two or more groups of beams which are transmitted at distinct time intervals. Each group of beams may generally include one or more beam (up to the upper limit imposed by the data bandwidth and/or beamforming parameters) covering one or more respective geographical areas. To this end, each group of beams establishes at least one of the forward communication channels transmitted by the system 300.

The system further includes a transmission scheduler module 350 configured to and operable for scheduling transmission of the two or more groups of beams. The transmission scheduler module 350 is configured and operable for scheduling the transmission data time slots at which the communication frames of the communication channel(s) of each group of beams are transmitted. More specifically according to some embodiments the transmission scheduler module 350 is adapted to schedule the communication frames of the channels of each group of beams so as to aggregate together the plurality recess timeslots R of those communication channels to form a prolonged recess time slot which duration is long enough so that the transmission of a different group of one or more beams can be accommodated in that prolonged time slot. In turn, the transmission channel signal encoder 330 and/or the beam encoder module 342 may be connectable to the transmission scheduler module 350 and may be adapted to encode the communication frames of each of the one or more channels of each beam in accordance with the scheduling of the scheduler. Accordingly, in this way the system 300 may be provide an efficient beam hopping implementation.

Figure 4D:
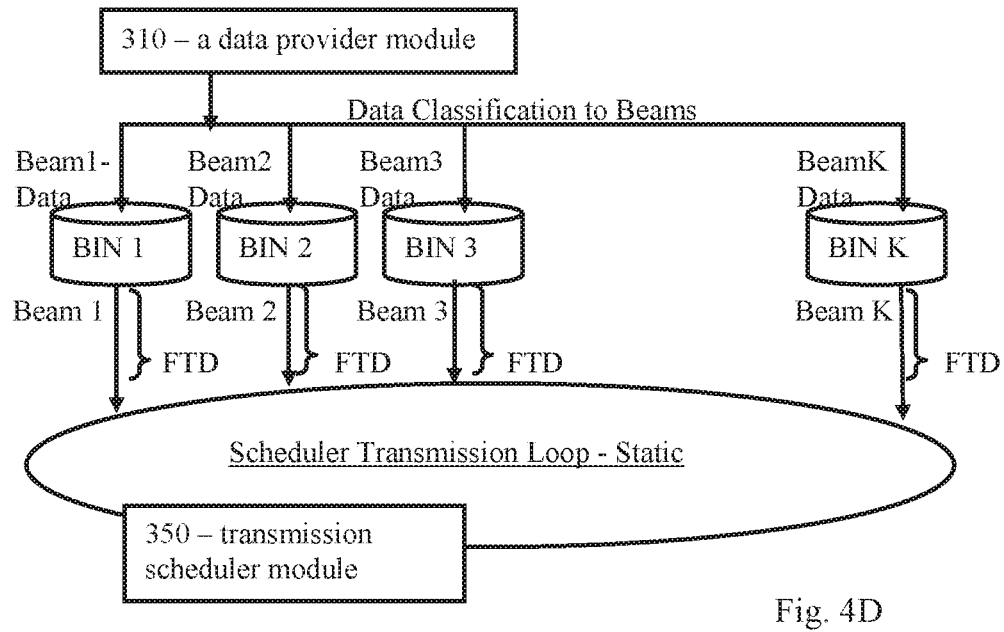
FIGS. 4D and 4E are flow diagrams exemplifying the operation of a transmission scheduler module 350 of the communication transmission system of the present invention for carrying out a beam hopping transmission according to two embodiments of the present invention.
Figure 4E:
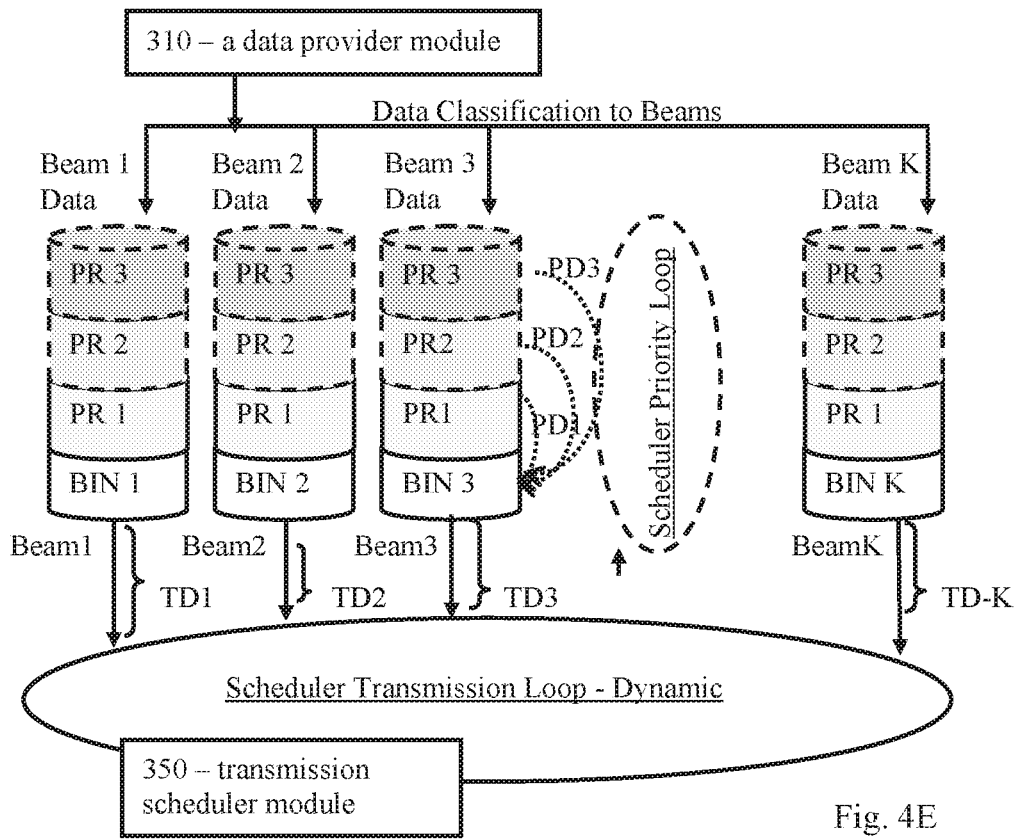

Reference is made to FIGS. 4D and 4E which are flow diagrams exemplifying the operation of the transmission scheduler module 350 according to two embodiments of the present invention in which it is configured and operable in static or dynamic scheduling modes.

As shown the transmission system 300 may include a data provider module 310 configured and operable for providing data to be communicated/transmitted by the system 300 towards different geographical areas, via different beams. In the non-limiting example of FIGS. 4D and 4E, K geographical areas are considered which are covered by respective beams Beam1-BeamK The data provider 310 may be for example adapted to obtain/receive the data to be remitted in the beams in the form of data packet/frames communicated to the system 300 from a ground station, such as a data gateway, whereby each packet may designate the geographical area to which it should be transmitted and/or the channel/beam in the scope of which it should be transmitted. The figures illustrate Beam1-Data to BeamK-Data which include the data packets that should be transmitted via each beam. The data packets in Beam1-Data to BeamK-Data may by themselves represent communication frames that should be transmitted by the respective beams, or in some cases they only include the payload data that should be transmitted and the communication frame generator 320 encapsulate those in respective communication frames (e.g. by adding thereto respective headers, such as physical layer communication headers. Accordingly, the data provider 310 obtains a plurality of communication data frames which should be communicated by the different beams Beam1-BeamK.

The obtained communication data frames are classified to the different beams based on for example any one or more of the following:

The channel through which communication data frame should be transmitted and the associated beam(s) in which this channel is transmitted;

The geographical area towards which the data frame should be transmitted and the associated beam covering it; and/or Specific information indicating through which beam each communication data frame should be transmitted.

Accordingly at the end, as illustrated in the figure, the communication data frame are actually classified/placed in K bins BIN-1 to BIN-K respectively representing the collections of communication data frames that should be transmitted by the respective beams Beam1-BeamK.

In turn the transmission scheduler module 350, operates a scheduler transmission procedure (e.g. loop), in which it schedules for transmission one or more of the communication data frames accumulated in each bin by the respective beam associated with the beam. In other word, during the scheduler's transmission procedure the scheduler 350 consecutively accesses the bins and upon accessing each bin (e.g. BIN2) it acquires certain numbers of communication data frames from the accessed bin (e.g. BIN2) and forwards those for encoding and transmission by the modules 330 and 340, while operating he transmitter 340 to transmitted those communication data frames of the specific bin (e.g. BIN2) in the framework of a corresponding beam (e.g. Beam2) directed to the respective geographical area to which those frames are designated. Accordingly the scheduler may truncate those communication frames which are transmitted, from their respective bin (e.g. BIN2). It should be understood that in general the consecutive manner in which the transmission scheduler module 350 accesses the bins may be a serially ordered manner (e.g. BIN1→BIN2→ . . . BINK) and/or in any different order (e.g. prioritized order or random).

Turning now more specifically to FIG. 4D, according to some embodiments of the present invention the transmission scheduler module 350, operates in a static scheduling mode. Each beam is allocated with a certain fixed time duration FTD during to which it is transmitted, regardless of the numbers/lengths of the communication data frames that should be transmitted by the beam. For instance the fixed time duration FTD may be a duration accommodating the durations of one or more super frames (e.g. DVB-S2 and DVB-S2X super frames), in which one or more communication data frames may be included.

Indeed, the fixed time durations FTD of different beams may be different in their lengths however they are static in the sense that their duration does not change regardless of the quantity of data (accumulated in the bins) which should be transmitted by each beam.

Typically, in some cases this static scheme is implemented in order to accommodate backward compatibility with communication protocols requiring that the transmission duration of each beam burst, in a beam-hopping mode), would last a certain fixed duration (e.g. the duration of a predetermined super frame length) or an integer multiples of this fixed duration. To this end, in this mode the scheduler module 350, and/or the transmitter 340, may be configured and operable such that the transmission of burst of a beam lasts a certain predetermined duration regardless of the amount of data to be transmitted. In such implementations the transmission channel signal encoder 330, may be adapted to generate, for each transmitted beam, complete super frame(s) of a predetermined fixed duration(s) while encoding therein the communication data frames that should be included in the beam and in case there is not enough data (not enough communication data frames) to fill an entire supper frame(s), further pad the rest of supper frame(s) with dummy symbols. In turn, in this mode the transmitter 340 transmits the super frames (padded or not) in their respective beams.

Turning now to FIG. 4E, according to the present invention there is yet provided an alternative transmission scheduling scheme, dynamic scheduling mode, according to which the scheduler 350 is configured to operate in some embodiments of the present invention. In the dynamic mode there is no predetermined allocation time durations for the transmissions of each beam, but instead variable time durations TD1, TD2 to TDK, are dynamically allocated to the different beams, to each bursts thereof, as per demand/requirement so as to more efficiently exploit the resources of the transmission system. To this end, in this case there is no need to transmit dummy symbols and/or to pad super frames which such symbols and the time extent of super frames (if any) transmitted in each burst of each beam may vary per demand, and optimized to maximize the services provided by the transmission system.

In some embodiments the transmission scheduler module 350 is configured to operate in an un-prioritized dynamic scheduling mode. In this mode the scheduler 350 may for example operate a scheduler's transmission procedure in which consecutively accesses the different bins (e.g. in a predetermined order BIN1→BIN2→ . . . BINK) and upon accessing each bin (e.g. BIN2) it acquires all of communication data frames accumulated in the accessed bin (e.g. BIN2) to that time, and forwards those for encoding and transmission by the modules 330 and 340. Accordingly the transmitter 340 operates to transmit all the communication data frames of the specific bin (e.g. BIN2) in the framework of a corresponding beam (e.g. Beam2), which is directed to the respective geographical area to which those frames are designated.

In some embodiments the transmission scheduler module 350 is configured to operate in a prioritized dynamic scheduling mode. In this mode the data provider 310 further operates to classify the communication frames it puts in each bin, also to plurality of different priorities. For example in the non-limiting example of FIG. 4E three priority classes are set as follows: PR1 (highest). PR2 (intermediate) and PR3 (lowest). Each priority e.g. from the priorities PR1 (highest), PR2 (intermediate) and PR3, may be associated with a certain maximal time delay threshold (e.g. PD1 to PD3 respectively) indicated in the maximal time delay on which the communication data frames of this priority are permitted to be delayed before transmission. The classification to priorities may be conducted based on various considerations, for example any one or more of the following:
(i) The nature of the payload data in the communication frames. E.g. assigning: high priority to Real-Time data communications such as live streams; regular intermediate priority to standard data transmissions; and low priority to background data transmissions such as backup operations.
(ii) The channels with which the communication data frames are associated.

Whereby some channels (e.g. possibly associated with different customers of the system) may be associated with higher/better service levels and therefore higher priority and/or other channels may be associated with lower service levels and thus lower priorities.
Other prioritizing schemes may be employed as well.

In turn in this mode, prioritized dynamic scheduling mode, the scheduler 350 may for example operate a scheduler's transmission procedure in which it consecutively accesses the different bins (e.g. in a predetermined order BIN1→BIN2→ . . . BINK) and upon accessing each bin (e.g. BIN2) it acquires all of communication data frames that are accumulated only in the highest level of priority (e.g. PD1) accumulated in the accessed bin (e.g. BIN2) to that time, and forwards those for encoding and transmission by the modules 330 and 340. Accordingly the highest level priority communication frames are transmitted as soon as possible, Additionally in this mode, prioritized dynamic scheduling mode, the scheduler 350 may further operate an additional procedure, priority update procedure in which it updates the permitted time delays of the remaining communication data frames of the different priorities, and accordingly updates their current priorities (e.g. leave them in their previous priority and/or advancing them to higher priority) based on whether the relation between their updated permitted time delays and the maximal time delay threshold (e.g. PD1 to PD3) of the respective priority levels (e.g. PR1 to PR3).

In this manner an efficient prioritized beam hopping mode operation is implemented with reduced transmission of dummy symbols and/or without dummy symbols at all, and with priorities transmission of communication frames in the different beams.

Yet another embodiment of the dynamic scheduler maybe, referring again to FIG. 4E whereby transmission of a packet in a bin is made when the bin has reached a predetermined capacity level, or when some predetermined timer set according to the time delays (e.g. PD1-PDK) has expired, such that the order of transmission is not fixed yet no dummy frames are added to the transmission.

Figure 5A:
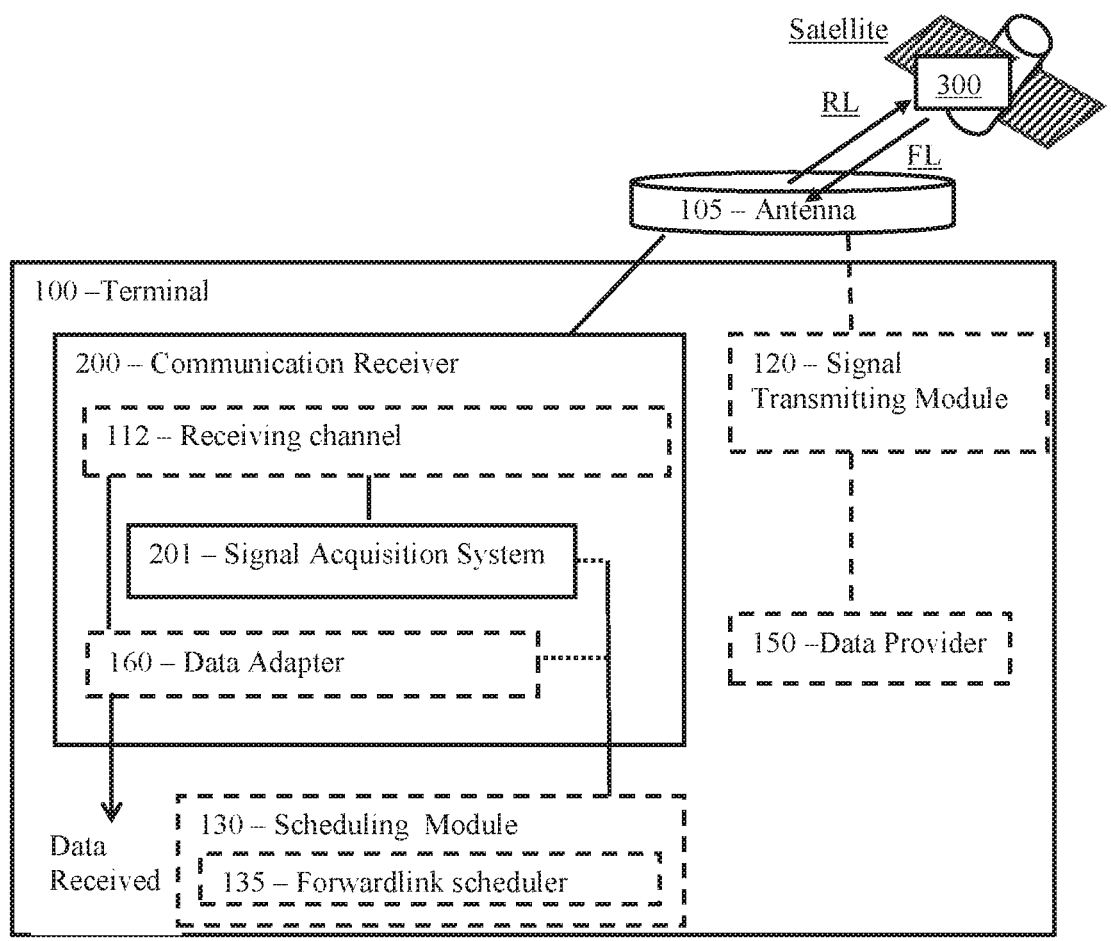
FIG. 5A is a block diagram of a communication terminal (e.g. satellite communication terminal) according to an embodiment of the present invention.

Reference is made to FIG. 5A showing a block diagram of a communication terminal 100 (e.g. satellite communication terminal) according to an embodiment of the present invention. The communication terminal 100 is configured and operable for wirelessly communicating, directly or indirectly, with a designated data gate-way station (not specifically shown) for exchanging data therewith view a forward-link communication channel FL, by which data is received by the terminal 100, and a returned-link communication channel RL by which data is transmitted from the terminal 100. In the present non-limiting example, the communication terminal 100 is a satellite communication terminal, which is configured and operable for communicating indirectly with the data gateway, via a communication mediator being presented here for example as a transmission system 300, such as that described above, furnished on a satellite. Namely in this example the communication terminal 100 is configured and operable for establishing the forward communication channel FL with the transmission system 300.

In the present example, the transmission system 300 is configured and operable for making efficient use of its communication resources (data bandwidth/rate). As indicated above, this may achieved according to some embodiments of the present invention by omitting dummy frames from the communication channel(s) and timely aggregating (bunching) together the data bearing communication frames (which carry meaningful data payloads) of one or more of channels which should be transmitted from the transmission system 300 in a common beam. Accordingly, a certain number of data bearing communication frames pertaining to the channels of the beam are communicated sequentially, with practically no time gaps between them, and thereafter a prolonged recess time is introduced (instead of the dummy frames which are omitted), in which the beam's signal may not be transmitted, and the transmission may direct its resources for transmission of other beams.

In turn, the communication terminal 100 perceives a bursty communication from the satellite/transmission system 300, which includes bursts in which a certain numbers of communication frames are transmitted from the transmission system, and prolonged recess times between them during the terminal may receive no signal from the satellite.

Accordingly, the terminal 100 includes communication receiver 200 which is configured and operable according to the present invention and adapted for efficiently receiving and processing signals received in a burst communication mode from the transmission system, The communication receiver 200 may be configured and operable for example according to any one of the examples illustrated in FIG. 6A discussed below, and is adapted for processing at least a portion of the beam's signal, which is received after the prolonged recess time periods during which the beam may have not being transmitted from the satellite, to determine a carrier frequency of the beam's signal. Preferably according to some embodiments of the present invention the communication receiver 200 is adapted to determine the carrier frequency based on only single communication frame that appears in the portion of the beam's signal which is received after the prolonged recess time period. In some implementations the communication receiver 200 includes a Signal Acquisition module 201 configured and operable for detecting the communication burst, acquiring its signals (namely determine the carrier frequency of the respective beam) and locating the timings of the communication frames therein by processing a single communication frame (typically the first communication frame), and optionally by processing only the header of the single/first communication frame, which appears in the burst. This is achieved for example in the manner described below with reference to any one of FIGS. 6A to 6C. This detection and time location of the first/single communication frames in the timely separated bursts enable the receiver to efficiently process and decode the data encoded in the communication frames of the burst while without requiring re-transmission of communication frames.

In some embodiments of the present invention, the communication terminal 100 also includes a scheduling module 130 that is configured and operable for determining the designated time intervals (e.g., the timing and duration) during which communication bursts of the beam's transmission from the satellite may expected to be received by the specific terminal 100 (and/or by other terminals in the same geographical coverage area of the beam). For instance, some of the data previously received by the terminal, may contain transmission/reception plan (e.g. conveyed to from the gateway) and indicative of respective transmission/reception times of different beams (e.g. in a multi-beam/beam-hopping systems), as well as time stamp information, which is an indication of the frame/beam transmission time as measured by a network clock (e.g. located at the gateway with which the satellite may be associated). This information, also known as Network Clock Reference is standardized. Based on this information the scheduling module 130 schedules the reception time intervals during which the receiver 200 should be operated to receive the bursts of the communication beam which is directed to its geographical area by the satellite.

In some embodiments, the scheduling module 130 includes a forward link scheduler module 135 that is configured and operable to utilize the time interval data and assign a forward link schedule for receiving the beam's burst. In some implementations the forward link scheduler module 135 generates operative instructions/signals for activating the communication receiver module 110 of the terminal 100 for receiving the designated burst of the beam during the respective time interval.

In some implementations the forward link scheduler module 135 is configured and operable for generating operative instructions/signals for deactivating the communication receiver 200 of the terminal 100 during one or more time slots at which the forward link is occupied by sub-frames that are designated to other terminals/terminal-groups. This may be for example used for reducing/suppressing noise and/or crosstalk between the received forward link signal and the transmitted return link signals.

Accordingly the communication receiver 200 may be connectable to the scheduling module 130 and configured and operable to be responsive to operative instructions therefrom for performing signal receipt operation during the forward link schedule. This communication receiver 200 thereby receives and processes the bursts of the beam designated to the terminal 100 and/or it geographical area, at the correct time intervals at which they are transmitted.

Typically the communication receiver 200 may include a receiving channel (not specifically shown in FIG. 5A) configured and operable for applying preprocessing to the analogue signal received from the antenna 105 associated with the terminal. For example the receiving channel may include any one or more of the following modules, which may be implemented as analogue and/or digital modules: signal mixers and/or down-converters (e.g. for applying frequency shift/transform to the signal, such as reducing the signal frequency to the baseband) and/or bandpass filters (e.g. matched filter, for applying bandpass filtration to the received signal) and/or Analogue to Digital converter(s)/samplers (for Sampling the analogue signal from the antenna 105 to convert it to digital form, and/or/Q signal converters (for processing the received signal to the complex I/Q signal representation form), and/or phased locking loops (PLLs) for maintaining synchronization with the phase of the received signal; and or other modules. In this connection, a person of ordinary skill in the art will readily appreciate how to configure a receiving channel for particular requirements and/or characteristics of the terminal and/or the physical layer parameters of the forward link channel.

The signal receiver 110 may also include a Forward Link Data Adapter 160, adapted for processing the received signal (e.g. after its preprocessing by the receiving channel) and extracting forward link data therefrom. More specifically, the Forward Link Data Adapter 160 may be configured and operable for implementing a certain communication protocol (e.g. DVB-S2 or DVB-S2X) and may be configured and operable for processing the received designated sub-frames, which are designated to the terminal 100, in order to determine, in accordance with such protocol, the header segments and data segments of the designated frames/sub-frames and extract the data therefrom accordingly. A person of ordinary skill in the art will readily appreciate of to implement the Forward Link Data Adapter 160 for a given communication protocol.

Figure 5B:
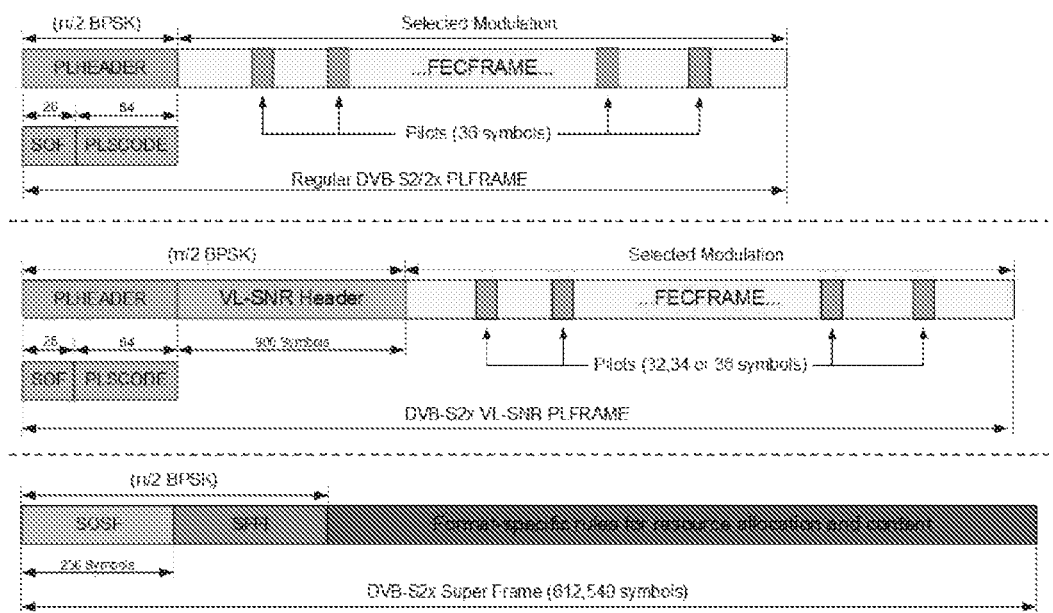
FIG. 5B is a diagram schematically illustrating three possible frame structures of the DVB-S2X standard/protocol.

For example reference is made to FIG. 5B which is diagram schematically illustrating in self-explanatory manner three possible frame structures of the DVB-S2X standard/protocol. In this example three frame types are illustrated: A regular frame, a very low signal-to-noise ratio noise frame (referred to as VL-SNR frame), and super frame. The code words (e.g. unique words referenced UW in FIGS. 6B and 6C below) used in the frames may include as follows:

- A start of frame (SOF) which is a 26 symbols sequence.
- A complete header, 90 to 180 symbols which contain an encoding of some frame information. If this information is pre-configured or otherwise know to the receiver, it may serve as a UW.
- A VL-SNR frame of the DVB-S2X protocol may include code word (UW) in the form of a VL-SNR header which contains 900 symbols (there could be different sequences of this code word).
- A super frame of the DVB-S2X protocol may include SOSF (Start Of Super-Frame) code word (UW) in which contains 270 symbols (there could be different sequences of this code word).

Turning back to FIG. 5A, optionally, in some embodiments the communication terminal is further configured and operable for establishing the return communication channel RL with the transmission system 300 for transmitting data back to the satellite. To this end, optionally in such embodiments the terminal 100 further includes a signal transmitting module 120 and a data provider module 150 configured and operable for transmitting return link data during the return link schedule. The data provider module 150 may be configured and operable to prepare and provide the return link data that should be transmitted to the satellite and the signal transmitting module 120, may be configured and operable for encoding the returned link data on a signal to be transmitted by the antenna 105 (e.g. by properly modulating the signal to be transmitted according to a certain modulation scheme associated with a predetermined data transmission protocol) and thereby generate the transmitted signal that is to be transmitted by the antenna.

As indicated above, in some implementations of the present invention the scheduler module 130 is configured and operable for activating the communication receiver 200 at time intervals at which the designated communication bursts from the satellite's beam should be received by the terminal and possibly deactivating the receiver module 100 at other time slots (e.g. for instance in order to reduce cross-talk between the receipt/transmit channels and/or reduce other noises and/or save energy). To this end, in some implementations the terminal 100 is configured such that the signal transmitting module 120 and the signal receiving module 110 thereof are configured for operating at mutually exclusive time slots for transmitting and receiving the respective return and forward link signals.

It should be noted that in various cases/implementations of the terminal system 100 above, the communication receiver 200 may lose (dis-acquire) the signal of the beam from the transmission system 100, in the senses that it losses synchronization/locking with the carrier frequency of the signal. This may occur for example in cases where the beam to be received by the terminal 100 is communicated in bursty communication mode (with recess times between the burst), and/or in cases where the communication receiver 200 is deactivated at certain time recesses. In these cases the carrier frequency locking module(s) of the signal receiving module 200 is/are not operable/activated for locking on to the signal's carrier, thereby allowing the carrier frequency to drift out of tune. Even more specifically, cases where prolonged recess times appear between sequential bursts of the beam, and/or in implementations of the system, in which the receiver 200 is deactivated for relatively long periods of time (e.g. sleep periods or beam hopping scenarios when the satellite transmits its energy to different areas (cells) at different times), there may occur a signal loss (e.g. phase synchronization loss) between the forward link signal and the receiver. This is because in such cases the receiver's phase synchronization mechanisms, such as a phase lock loop thereof) may be functionally inoperative.

To this end, in such cases, a conventional communication receiver may not be able to immediately lock/find the forwards link signal. This is because such a drift may cause a discrepancy between the carrier frequency to which the receiver is tuned and the actual carrier frequency over which data is encoded on the forward link signal. Indeed, this may be overcome by applying sequential carrier frequency scanning immediately after activation the receiver, by sequentially tuning the receiver to different carrier frequencies in an attempt to identify the correct carrier frequency about which the forward link signal data is encoded. However, such sequential carrier frequency scanning is time consuming operation (particularly in cases where the communication frames carry large data payloads—since it the duration of a complete communication frame is required at each such scanning step in order to identify the header of the frame).

Therefore, according to some embodiments of the present invention the communication terminal 100 (e.g. the signal receiving module 110 thereof) includes a novel communication receiver 200 including a signal acquisition system 201, which is configured and operable for processing time frame of the received signal burst to simultaneously, at the same time/processing-stage/step, determine the carrier frequency of the signal burst out of a plurality of possible carrier frequencies. The processed time frame portion of the signal may be a portion of the signal extending not more than one communication frame, or not more than a header of such communication frame, and including one or more predetermined code words expected in the header. The signal acquisition system 201 is configured and operable to simultaneously determine (e.g. in parallel) whether the code words in the processed time frame are encoded over any one of a plurality of possible carrier frequencies (to which the received signal may have drifted relative to the receiver's reference carrier frequency). Accordingly, the novel communication receiver 200 of the present invention enables simultaneous locking on the carrier frequency of the forward link signal and therefore facilitates fast acquisition of the signal.

Thus in terminal 100, the signal acquisition system 201 is configured for operating upon activation of the receiver for process at least a part of the communication frame received in the forward link (e.g. from the satellite/mediator 300) to lock on to the forward link signal (e.g. on to the exact frequency thereof). This allows to immediately (with no delays) identify at least one code word in the received signal designating whether the received signals encompasses a designated sub-frame of interest, and determine a time index (sample position) at which said code word is encoded in the received signal (namely determining the initial/reference time/sample of the sub-frame of interest in the received signal and the carrier frequency over which data (e.g. code word) is encoded in the received signal.

Accordingly, as discussed above, in some implementations the communication terminal 100 of the present invention can implement an efficient beam hopping technology Relying inter-alia on the ability of the communication receiver 200 of the present invention to efficiently locking on the carrier frequencies of unknown/newly received signals in real time (namely within one/first communication frame). This allows the satellite's transmission system 300 beam to hop from one group of terminal to the other, and cause discontinuity in the forward link of each terminal, while without the cost of time consuming signal acquisition (carrier frequency locking) at the times of reestablishment of the forward link signals to a particular terminal.

Figure 6A:
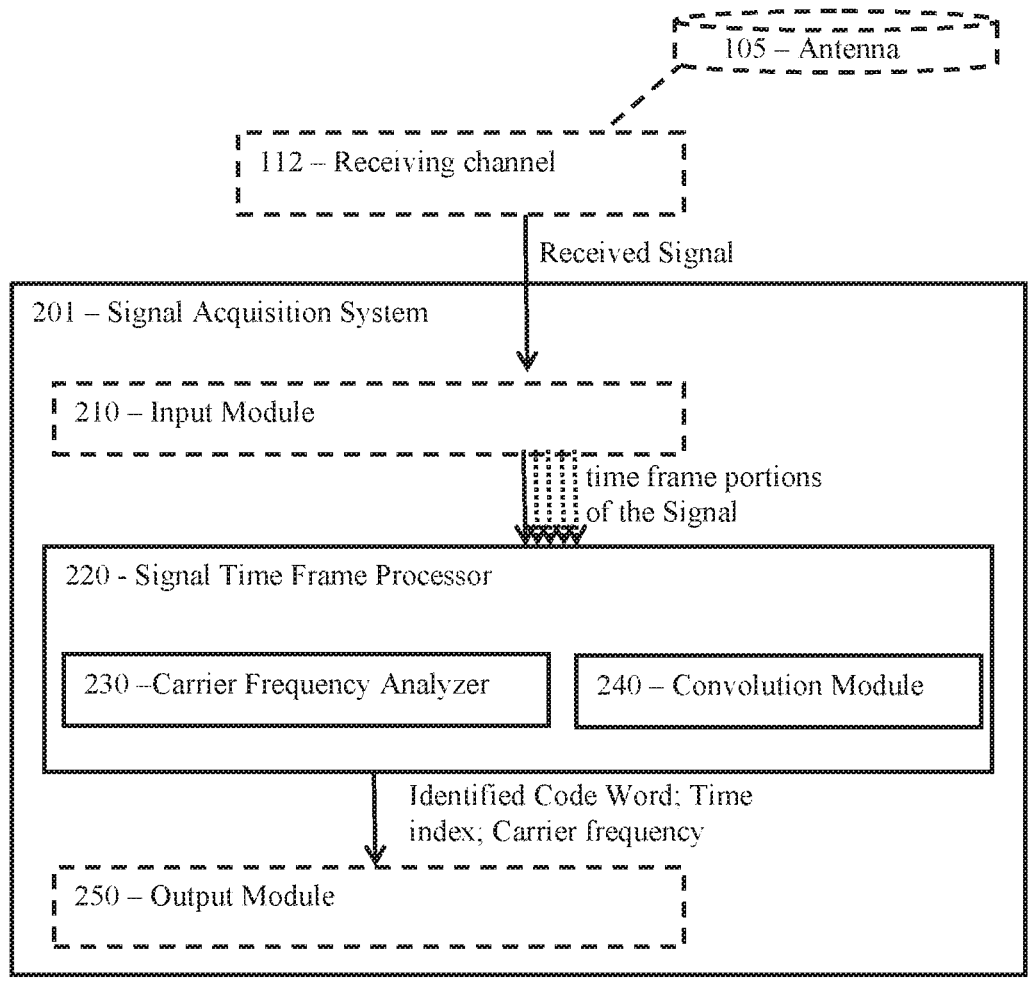
FIGS. 6A to 6C are block diagrams of several examples of signal acquisition system according to various embodiments of the present invention.
Figure 6B:
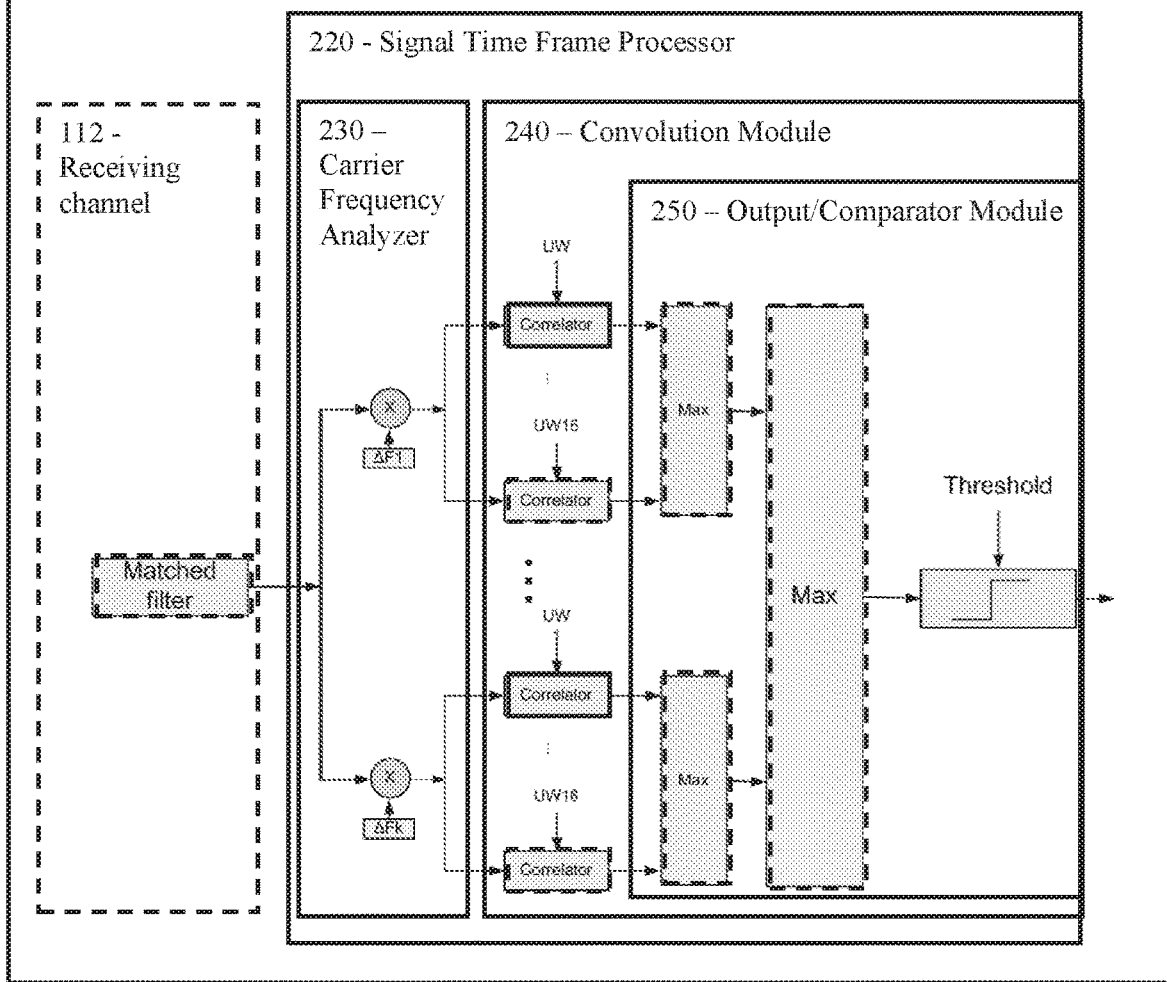
Figure 6C:
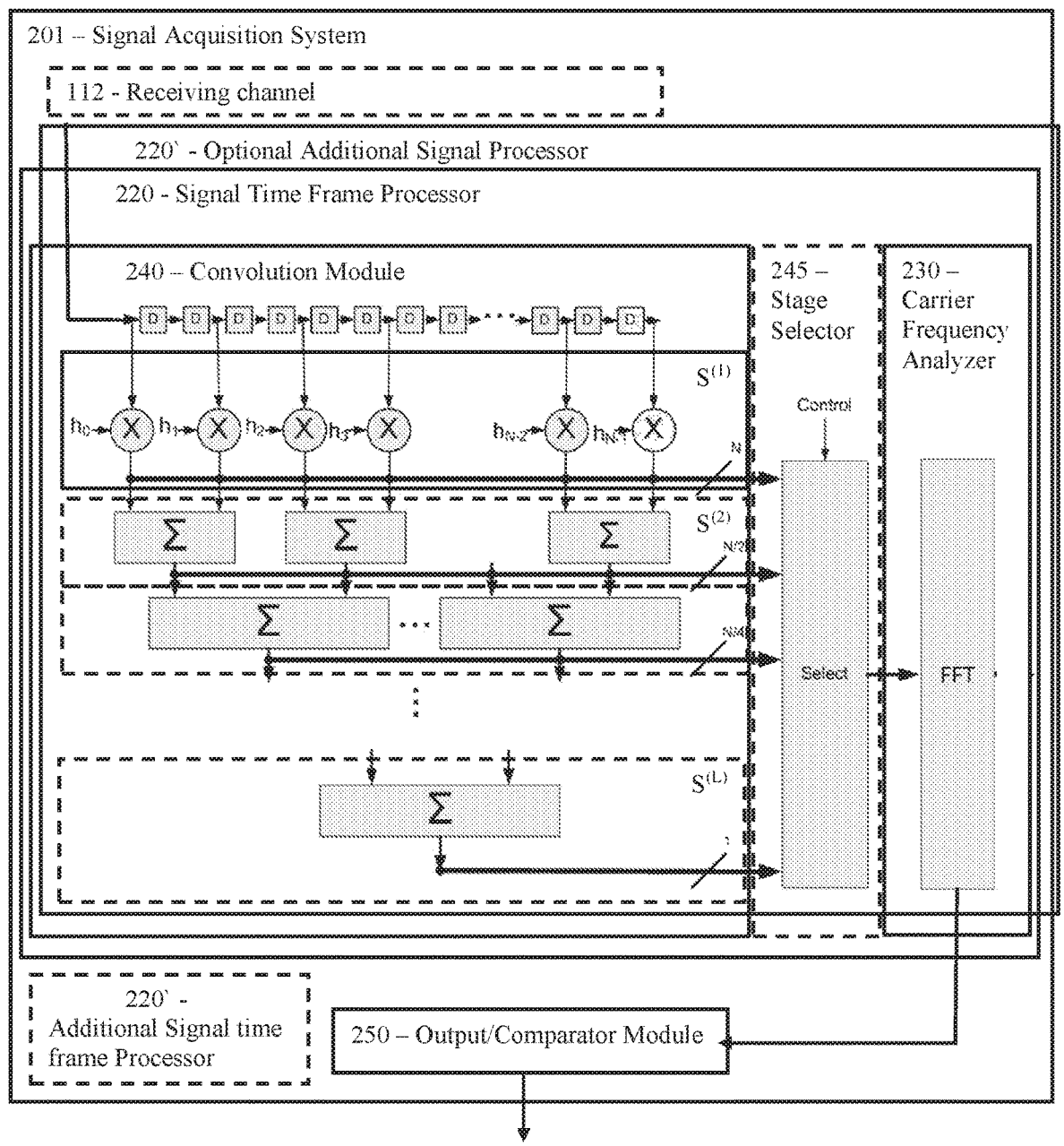

Turning now together to FIGS. 6A to 6C, there are illustrated in block diagrams several examples of signal acquisition system 201 which may be included in the communication receiver 200 according to various embodiments of the present invention.

The signal acquisition system 201 according to certain embodiments of the present invention includes:
  an input module 210 configured and operable to obtain a received signal (e.g. electro-magnetic (EM), typically radio frequency (RF), signal) which encodes communicated data over a certain carrier frequency;
  a signal time frame processor 220 that is connectable to the input module and configured and operable for continuous processing (e.g. in real time) of time frame portions of the received signal to identify at least one code word of a group of one or more predetermined code words, being encoded in a time frame portion of the received signal; and
  an output module configured and operable for outputting identification data indicative of identification of said code word in the signal.

The acquisition engine/system 201 is a part of the receiver 110, the purpose of which is to acquire the received signal, namely detect the existence of a received signal and synchronize to the basic frame structure. The receiver might to acquire the received signal in two, rather different circumstances:
  Cold start, wherein the terminal needs to acquire the satellite signal without any prior information. Synchronization procedures mainly include carrier frequency correction, sampling timing correction, frame synchronization, equalization and fine phase correction.
  Signal loss, wherein the signal is lost for a short period. In this case, most of the parameters are available, and after reception is resumed, full acquisition can be readily achieved.

It can be quite safely assumed that the burst receiving conditions are more of the signal loss type rather than cold start, but, depending on the off-time interval, oscillator's drift and instability and dynamic changes may require that the receiver performs re-acquisition.

The acquisition engine/system 201 is designed to achieve recovery from a signal loss within a single transmission frame. Possible applications may include: operation as a terminal receiver in a Frame by frame beam-hopping environment, and operation when dummy frames are omitted hence the resulting transmission is discontinuous.

In some cases, particularly after long durations in which the receiver is not locked to the signals which is to be received, the actually carrier frequency of the signal to be received may be unknown at the receiver end (e.g. due to frequency drift) and may actually reside anywhere within a certain, e.g. predetermined, frequency band in which frequency shift due to drifting can occur. To this end the actual carrier frequency can at any one of a plurality of possible carrier frequencies within this frequency band.

Therefore, according to some embodiments of the present invention the signal time frame processor 220 is adapted to overcome this problem of the carrier frequency drifting, and configured and operable for applying real time processing of the received signal to identify in real time the whether any one or more code words are encoded in the received signal over any of the possible one or more carrier frequencies.

To this end, in some embodiment, the signal time frame processor 220 includes a carrier frequency analyzer module 230 configured and operable for analyzing a time frame portion (or one or more time frame portions) of the received signal in conjunction, simultaneously, with the plurality of possible carrier frequencies of the received signal. More specifically the carrier frequency analyzer module 230 is configured and operable for transforming the time frame portion of the received signal to generate (simultaneously) carrier-data which includes a plurality of carrier-data-pieces associated with each possible carrier frequency of the plurality of possible carrier frequencies of the received signal, respectively. The transform is carried out such that each of the carrier-data pieces are indicative of data is decoded from the processed time frame portion by in case such a decoding was made by assuming one of the possible carrier frequencies the received signal might have had acquired. In other words, each carrier-data piece is indicative of a "pseudo" data (meaningful or not) encoded in the time frame portion over certain assumed one of the possible carrier frequencies associated with said carrier-data piece.

For instance, as will be described in more details below, in the embodiments of FIG. 6B, the carrier frequency analyzer module 230 includes an array of signal frequency transformers, (e.g. implemented as digital or analogue signal mixers and/or frequency-shifters) $\Delta f_1 \ldots \Delta f_n$ which are configured and operable for applying difference respective frequency shifts $\Delta f_1$-$\Delta f_n$ to the time frame portion of the received signal thereby respectively generate n carrier-data pieces associated with differently frequency shifts of the received signal. Even more specifically, these simultaneously generated carrier-data pieces are actually frequency shifted replicas of the processed time frame portion of the received signal having their carrier frequencies shifted by the different predetermined frequency shifts $\Delta f_1$-$\Delta f_n$ respectively relative to the certain undetermined/unknown carrier frequency of the received signal. Accordingly in this case each carrier-data piece is indicative of a "pseudo" data (meaningful or not) encoded in the time frame portion over certain assumed one of the possible carrier frequencies associated with said carrier-data piece.

In another example of FIG. 6C, the carrier frequency analyzer module 230 includes a time to frequency transformation module, which transforms the convolution results of the time frame portion of the received signal with a certain code word which might have being encoded in the signal, and transforms these convolution results from the time domain to the frequency domain. The time to frequency transformation may be implemented for example using Fourier transform (e.g. Fast Fourier Transform (FFT) and/or Discrete Fourier Transform (DFT)) and/or via any suitable time-frequency transform. Accordingly, a result of the transform is generally a series of bins in the frequency domain. In this case, (transforming the convolved time frame portion of the signal with the code word), the bins actually present carrier-data pieces whereby the intensity (magnitude) of each bin number is indicative of whether the specific code word used in the convolution is encoded in the time frame portion of the signal under the assumption of a certain one of the possible carrier frequencies (or in other words under the assumption that the received signal is shifted by one of the frequency shifts $\Delta f_1$-$\Delta f_n$ associated with the particular bin. To this end, the bins together present a plurality of carrier-data pieces indicative of the plurality of possible frequency shifts of the carrier frequency of the received signal.

In some embodiment, the signal time frame processor 220 also includes a convolution module 240 configured and operable for processing the time frame portion of the signal to simultaneously identify whether the time frame portion encodes the at least one code word, over any one of the a plurality of possible carrier frequencies simultaneously.

In this connection, as shown for example in the embodiment of FIG. 6B, the convolution module 240 includes a plurality of at least n correlator modules connectable/connected to the plurality of n signal mixers (frequency-transformers/shifter; e.g. to their output) and respectively configured and operable for simultaneously convolving the n plurality of n carrier-data pieces (e.g. which are in this case constituted by respectively differently frequency shifted signal portions) with a certain code word (or possibly with a plurality of m code words). Accordingly in this case the n correlator modules of convolution module 240 in FIG. 6B generate simultaneously n convolved signal representations whereby each convolved signal representation is indicative of whether the convolved code word is encoded in the time frame portion of the signal with a certain corresponding one of the carrier frequency shifts $\Delta f_1$-$\Delta f_n$.

In another embodiment, that illustrated in FIG. 6C, the wherein the convolution module 240 precedes the frequency analyzer module 230 with reference to the direction of the signal processing flow by the system. In this case the convolution module 240 is a word convolution module which is adapted to convolve (during a first and optionally only convolution stage) $k^{(l)}$=n successive (typically equal sized) segments of the time-frame portion of the signal, with corresponding successive symbols/constituents of the code word (e.g. each symbol may be constituted by one or more bits of the code word). This yields an order series of n respective symbol-convolved signal representations (which correspond to timely ordered segments in the received signal), whereby each symbol-convolved signal representation indicates of whether a respective symbol/constituent is encoded in the time-frame portion. Then, by implementing the time-to-frequency transformation of the order series of n respective symbol-convolved representations, a frequency representation of the code word convolution with the time frame portion of the received signal is obtained. The frequency representation actually presents carrier data and includes a plurality of bins presenting carrier data portions indicating whether the code word and at which carrier frequency the code word is encoded in the time frame portion of the received signal. More specifically, the intensity of each bin numbers indicates whether the code word is actually encoded in the time frame portion of the received signal and a particular carrier frequency associated with the location of the bin in the frequency representation. In other words by comparing the bins with certain threshold, and detecting a bin exceeding the threshold, the carrier frequency of the received signal can be determined from the bin location in the frequency representation and the code word is identified as encoded over that carrier frequency in the respective time frame portion of the received signal.

To this end, the time frame processor 220 is adapted to determine a time index of code word in the received signal, based on the time frame portion of the received signal at which the code word is identified. Accordingly the output module may be further adapted to output this time index data, as this time index data actually designates/indicate a reference/initial location of a communicating data frame communicated over the received/forward link signal.

Also, the time frame processor 220 is adapted to process carrier data to identify the carrier-data piece which encodes significant data and thereby determines the carrier frequency of the received signal. The output module 250 is further adapted to output said determined carrier frequency.

Referring specifically to FIG. 6B, as indicated above, in this embodiment, the carrier frequency analyzer module 230 of the signal acquisition system includes a plurality of n signal mixers/shifters (transformers) $\Delta f_1$-$\Delta f_n$ configured an operable for simultaneously processing the received signal. To this end, the signal mixers are adapted to apply a plurality of n respectively different predetermined frequency shifts to the received signals and thereby generate a plurality of n respectively different frequency shifted signals having their carrier frequencies shifted by said different predetermined frequency shifts relative to the certain undetermined carrier frequency of the received signal. The convolution module 240 includes a plurality of at least n correlator modules connectable to the plurality of n signal mixers $\Delta f_1$-$\Delta f_n$ respectively and configured and operable for simultaneously convolving the plurality of frequency shifted signals respectively with the code word, to thereby concurrently generate n convolved signal representations indicative of whether the code words is encoded in said the corresponding frequency shifted signals.

FIG. 6B depicts, in a self-explanatory manner, the operational principles of the signal acquisition system 201. It relies on a priori known information (UW—Unique/code Word) transmitted by the transmitter within the transmitter frame. The received signal at the output of the optionally provided matched filter of the receiving path is frequency shifted and then correlated with several possible unique/code words UW. In some examples, the output/comparator module 250 is used to determine the start of frame based on the convolved signal representations (representing the correlations with the frequency shifts). To this end, the maximal absolute value of the correlation among all possible frequency shifts is tested and compared to a threshold value, and the timing when this threshold is passed determines the start of frame (time index).

According to some embodiment, the convolution module 240 includes a plurality of at least n×m correlator modules, for simultaneously testing whether any one of number m (integer) of code words UW is encoded in the received signal (in the time frame portion thereof). To this end, each group of m correlator modules is connectable to a respective one signal mixer of the n signal mixers $\Delta f_1$-$\Delta f_n$ and configured for simultaneously convolving a respective frequency shifted signal obtained by the respective one signal mixer with up to m code words simultaneously. The convolution module thus generates up to n×m convolved signal representations indicative of whether any one of the m code words is encoded in any one of the n frequency shifted signals respectively.

Accordingly in such embodiments the output module may include a code word identification module adapted for comparing n×m convolved signal representations with predetermined criteria and thereby to determine whether any code word is encoded in the frequency shifted signal corresponding to the convolved signal representation.

Turning now to FIG. 6C, the construction and operation of the signal acquisition system 201 are more specifically described. In this example, the convolution module 240 is implemented as a word convolution module and includes a plurality of $k^{(l)}$=n delay modules D configured and operable for applying $k^{(l)}$ different time delays to the received signal and thereby generate $k^{(l)}$ respective time delayed signals which are copies of the received signal (time frame portion thereof) delayed by the $k^{(l)}$ respective time delays. The convolution module 240 also includes at least a first word convolution stage S which includes: a code word provision module, which is not specifically shown and can be implanted digitally as a shift registers connected to a memory storing the predetermined code word UW, and which is adapted to provide $k^{(l)}$ data portions ho to $h_{n-1}$ indicative of n symbol constituents of the code word ($k^{(l)}$=n). The first word convolution stage $S^{(l)}$ further includes a plurality of $k^{(l)}$ symbol convolution modules (e.g. signal multipliers). Each symbol convolution module is connectable to a respective delay module of the plurality of delay modules, for receiving therefrom a corresponding time delayed signal, which is generated thereby, and is connectable to the code word provision module (shift register) for receiving corresponding symbol/constituent $h_i$ of the $k^{(l)}$ symbol constituents whose location in the code word UW corresponds to the respective time delay of the time delayed signal of the respective delay module D. Also, each symbol convolution module is configured and operable for convolving the time delayed signal with the corresponding symbol/constituent to generate a respective symbol-convolved signal representations indicative of whether said symbol constituent is encoded in the corresponding time delayed signal. Thus, the $k^{(l)}$ symbol convolution modules generate/$k^{(l)}$) symbol-convolved signal representations indicative of whether the $k^{(l)}$ symbol constituents of the code word are encoded in a timely order in the received signal. To this end, the first stage $S^{(l)}$ yields n symbol-convolved signal representations.

The signal acquisition system 201 also includes the carrier frequency analyzer module 230 including a time to frequency transformation module (e.g. FFT or DFT) adapted for receiving the $k^{(l)}$ symbol-convolved signal representations from the code word convolution module 240 and applying time to frequency transformation thereto to obtain a frequency based representation of the n symbol-convolved signal representations.

In mathematical terms, the operation can be described as follows:

Denote the input signal (complex IQ) as $s_n$, where n is the symbol number, where, without loss of generality, we can take n=0 as the first symbol in a frame (time frame portion).

For the code word UW sequence, the input signal can be described as:

$$S_{n+n_0} = h_n e^{j2\pi \tilde{f}(n+n_0)T_s}, n = 0, \ldots, N-1$$

where $h_n$ is the known symbol value of the UW. N is the number of symbols within the UW. $\tilde{f}$ is the frequency error (in Hz) between the received signal and the receiver oscillator. $T_s$ is the symbol time (1/Symbol rate) in seconds, $n_0$ is the actual delay of the received signal.

The operation performed by the acquisition module is then:

$$[n_0, k_o] = \max_n \max_k \left\{ \sum_{m=0}^{N-1} h_m^* s_{m-n} e^{-j2\pi m T_s \Delta f_k} \right\} = \max_n \max_k \left| \sum_{m=0}^{N-1} h_m^* h_{m-n+n_0} e^{-j2\pi m T_s (\Delta f_k - \tilde{f})} \right| \quad (1)$$

Namely the input signal is corrected by a frequency shift $\Delta f_k$ and then correlated with the UW. If the frequency $\Delta f_{k_0}$ shift equals that of the actual error, the result is the actual correlation between the received signal and the UW, which will peak at no.

In a specific example of the implementation, if we take $$\Delta f_k = \frac{k}{NT_s}$$

Eq. (1) can be written as:

$$[n_0, k_o] = \max_n \max_k \left\{ \sum_{m=0}^{N-1} h_m^* s_{m-n} e^{-j2\pi m T_s \frac{k}{NT_s}} \right\} = \max_n \max_k \left| \sum_{m=0}^{N-1} h_m^* h_{m-n+n_0} e^{-j2\pi \left(\frac{mk}{N} - \tilde{f}\right)} \right|$$

which is the FFT operation, performed over the terms $h_m^* s_{m-n}$.

The actual implementation is exemplified in FIG. 6C, in which the correlation to a given UW (of which the symbols are described as $h_i$) is performed first, and the hypotheses of the possible frequencies of the carrier signal are tested via DFT/FFT.

According to some embodiment, the signal acquisition system 201 is configured to be scalable to complexity. This can be achieved by configuring the word convolution module 240 with a cascade of convolution stage including the first convolution stage $S^{(1)}$ described above and one or more cascaded additional convolution stages $S^{(2) \text{ to } (L)}$ where each of the additional convolution stages 1, $S^{(l)}$, is adapted for receiving the $k^{(l-1)}$ symbol-convolved signal representations from the preceding convolution stage $S^{(l-1)}$ and aggregating (adding, summing) them to generate a set having a lower number of $k^{(L)}=k^{(L-1)}/N$ symbol-convolved signal representation pertaining to larger symbols of the code word. Also, in this embodiment, a selector module 245 is optionally used which is configured to selectively operate the time to frequency transformation module FFT based on the symbol-convolved signal representations obtained from a selected stage 1 of the set of stages. Accordingly, the frequency transformation module FFT transforms solely the $k^{(l)}$ symbol-convolved of the selected one of the convolution stages thereby enabling controllable adjustment of processing power requirements and accuracy of identification of the code word in the received signal.

Hence, for a high symbol rate, for which a given offset is translated into a small error relative to the symbol rate (and thus lower frequency resolution is required), averaging is performed over a large number of coefficients and the size (number of bins) of the FFT is smaller. This enables faster calculation. On the other hand, for lower symbol rates, where resources are available, full FFT can be performed, with high resolution.

In this regards, it should be understood that a peak in the frequency based representation (the output of the FFT/DFT) satisfying a predetermined criteria (threshold) indicates that the code word UW is encoded in the received signal. The location of the peak in the frequency based representation indicates a shift of the carrier frequency of the received signal; and the intensity (absolute magnitude) of this peak indicates significance level of the code word being encoded in the received signal (in the processed time frame portion thereof).

Therefore, in some embodiment, the output module comprises a code word identification module may include a comparison module adapted for comparing said the peak intensity with a predetermined criteria and thereby determine whether the code word is encoded in the received signal.

In some embodiments the signal acquisition system 201 is configured an operable for concurrently determining whether any one of a plurality of m>1 different code-words is encoded in the received signal. In such embodiments the signal acquisition system 201 may for example include a plurality of at least m word convolution modules 240 similar to those described above, or additional one or more time frame signal processors 220' for processing different respective code words.

The signal acquisition system 201 configured as in any of the above described examples of FIGS. 5A and 6A-6C, may be configured as a digital signal processing chip (system on chip) or part of a system on a chip. The input module may be associated with signal receiving channel connectable to an antenna module and including at least an analogue to digital converter adapted to sample an analogue signal from the antenna module and generate the received signal in digital form. The input module may be adapted to extract the time frames portions from the received signal as successive time frame portions of predetermined length successively shifted from one another by at least one signal sample.

The signal acquisition system as described above may be configured and operable to process the received signal to identify the at least one code word encoded in the signal and determine a time index (sample position) and whether the code word is encoded in the received signal and a carrier frequency over which the code word is encoded in the received signal.

The signal acquisition system 201 and/or the entire communication receiver 200 described above can be implemented in the chip as H/W accelerator for the DSP, e.g. on the same chip of the DSP.

According to the above-described technique, time synchronization may be performed in a hierarchal manner. This may, for example, be implemented as follows: The signal, a communication frame thereof, is generally composed as a sequence of symbols. Considering for example the case of DVB-S2X a symbol time can vary between 2 nsec (500 Msymbols per second) to 1 microsec (1 M sps). Symbols are ordered in communication frames. In DVB-S2X frames are between 3000 to 35000 symbols, which translates to 6 microsec to 35 msec. Frames can be organized as superframes containing about 600000 symbols. A superframe size may then be between 1.2 msec to 600 msec. Frames or superframe transmission times are therefore an integer multiple of the above. The acquisition engine/system 200 described above provides synchronization at a frame level. Symbol level synchronization can be performed at the modem itself using known algorithms (Gardner). Standardized methods (GPS, IEEE 1588 and Network Clock Reference (NCR) provide means to synchronize transmission times.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A communication receiver adapted for processing signals of a burst mode communication channel from a remote communication system, wherein the communication receiver is configured and operable for processing at least a portion of a signal received in said communication channel after a recess time period during which communication frames were not transmitted in said communication channel to determine a carrier frequency of said communication channel, based on a single communication frame appearing in the communication channel after said recess time period;
wherein the communication receiver comprises an input adapted to receive said signal and a signal time frame processor connectable to the input and configured and operable for continuous processing of time frame portions of the received signal to identity at least one code word of a group of one or more predetermined code words, being encoded in a time frame portion of the received signal; said signal time frame processor comprising:
a. a carrier frequency analyzer configured and operable for analyzing said a time frame portion of the received signal in conjunction with said plurality of possible carrier frequencies simultaneously, by transforming said time frame portion to generate carrier-data including a plurality of carrier-data-pieces associated with each possible carrier frequency of said plurality of possible carrier frequencies respectively, whereby each of said carrier-data pieces being indicative of data encoded in said time frame portion over a carrier frequency associated with said carrier-data piece; and
b. a convolver configured and operable for processing the time frame portion of the signal to simultaneously identify whether said time frame portion encodes said at least one code word, over any one of said a plurality of possible carrier frequencies;
wherein said time frame processor is adapted to determine a time index of said code word in the received signal based on said time frame portion of the received signal at which said code word is identified; and wherein said communication receiver further comprises an output adapted to output said time index.

2. The communication receiver of claim 1 configured and operable for identifying at least one code word in said communication frame and determine a time index at which said code word is encoded in the received signal and a carrier frequency over which said code word is encoded in the received signal.

3. The communication receiver of claim 1 wherein the input is adapted to receive said signal (e.g. EM signal) whereby said signal encodes communicated data over a certain unknown carrier frequency, being any one of a plurality of possible carrier frequencies residing within a predetermined frequency band.

4. The communication receiver of claim 1 wherein said signal encodes communicated data over a certain unknown carrier frequency, being any one of a plurality of possible carrier frequencies; and said carrier frequency analyzer comprises a plurality of n signal mixers configured and operable for processing the received signal simultaneously whereby said plurality of signal mixers are adapted to apply a plurality of n respectively different predetermined frequency shifts to the received signals and thereby generate a plurality of at least n respectively different frequency shifted signals having their carrier frequencies shifted respectively by said different predetermined frequency shifts relative to said certain unknown carrier frequency of the received signal.

5. The communication receiver of claim 4 wherein said convolver comprises a plurality of at least n correlator modules connectable to said plurality of n signal mixers respectively and configured and operable for simultaneously convolving said plurality of frequency shifted signals respectively with said code word, to thereby generate a n convolved signal representations indicative of whether said code words is encoded in said frequency shifted signals respectively.

6. The communication receiver of claim 5 wherein said convolver comprises a plurality of at least nXm correlator modules, whereby m being an integer number greater than one; and wherein each group of m correlator modules of said nXm correlator modules is connectable to a respective one signal mixer of said plurality of n signal mixers and is configured for simultaneously convolving a respective frequency shifted signal obtained by said respective one signal mixer with up to m code word simultaneously; said convolver thereby generates up to nXm convolved signal representations indicative of whether any one of said m code words is encoded in any one of said n frequency shifted signals respectively.

7. The communication receiver of claim 6 comprising a code word identifier comprising a comparison module adapted for comparing at least one convolved signal representation of said n convolved signal representations with a predetermined criteria and thereby to determine whether said code word is encoded in the frequency shifted signal corresponding to said convolved signal representation.

8. The communication receiver of claim 1 wherein said convolver comprises a word convolver comprising:
   a. a plurality of $k^{(l)}=n$ delays configured and operable for applying $k^{(l)}$ different time delays to the received signal and thereby generate $k^{(l)}$ respective time delayed signals being copies of said received signal delayed by said $k^{(l)}$ respective time delays; and
   b. at least a first word convolution stage $S^{(l)}$ comprising:
      i. a code word provider adapted to provide $k^{(l)}$ data portions indicative of n symbol constituents of said code word; and
      ii. a plurality of $k^{(l)}$ symbol convolvers; whereby each symbol convolver of said plurality of $k^{(l)}$ symbol convolvers is connectable to a respective delay of said plurality of delays, for receiving therefrom a corresponding time delayed signal, which is generated thereby, and is connectable to said code word providers for receiving corresponding symbol constituent of said $k^{(l)}$ symbol constituents which location in said code words corresponds to the respective time delay of the time delayed signal of the respective delay, and configured and operable for convolving said time delayed signal with said corresponding symbol constituent to generate a respective symbol-convolved signal representations indicative of whether said symbol constituent is encoded in the corresponding time delayed signal; said $k^{(l)}$ symbol convolvers thereby generate $k^{(l)}$ symbol-convolved signal representations indicative of whether said $k^{(l)}$ symbol constituents of the code word are encoded in a timely order in said received signal.

9. The communication receiver of claim 8 wherein said carrier frequency analyzer comprises a time to frequency transformation module adapted for receiving said $k^{(l)}$ symbol-convolved signal representations from said code word convolver and configured and operable for applying time to frequency transformation to said $k^{(l)}$ symbol-convolved signal representations to obtain a frequency based representation of said n-symbol-convolved signal representations.

10. The communication receiver of claim 9 wherein said time to frequency transformation is a Fourier transform; and wherein a peak in said frequency based representation satisfying a predetermined criteria (threshold) indicates said code word being encoded in the received signal; a frequency index of said peak in said frequency based representation indicates a shift of the carrier frequency of said received signal; and an intensity of said peak indicates significance level of said code word being encoded in the received signal.

11. The communication receiver of claim 8 wherein
    said word convolver comprises a convolution stage cascade comprising said first convolution stage $S^{(l)}$ and one or more cascaded additional convolution stages $S^{(2)\ to\ (L)}$ each of the additional convolution stages $S^{(L)}$ being configured and operable for receiving the $k^{(L-1)}$ symbol-convolved signal representations from convolution stage $S^{(L-1)}$ preceding and aggregating the symbol-convolved signal representations to generate a set having a lower number of $k^{(L)}=k^{(L-1)}/N$ symbol-convolved signal representation pertaining to larger symbols of the code word; and
    the communication receiver further comprises a selector module configured and operable for selectively operating said time to frequency transformation module based on the symbol-convolved signal representations obtained from a selected stage of the set of convolution stages thereby enabling controllable adjustment of processing power requirements and accuracy of identification of said code word in the received signal.

12. A method of receiving signals comprising:
    receiving signals transmitted in a burst mode communication channel from a remote communication system;
    processing at least a portion of a signal received in said communication channel after a recess time period during which communication frames were not transmitted in said communication channel; and determining a carrier frequency of said communication channel, based on a single communication frame appearing in the communication channel after said recess time period;

wherein said signal being received encodes communicated data over a certain unknown carrier frequency, being any one of a plurality of possible carrier frequencies residing within a predetermined frequency band; and wherein the method comprises processing time frame portions of the received signal to identify at least one code word of a group of one or more predetermined code words, being encoded in a time frame portion of the received signal; said processing of the time frame portions comprising:

a. analyzing a time frame portion of the received signal in conjunction with said plurality of possible carrier frequencies simultaneously; and b. convolving the time frame portion of the signal with at least one code word to simultaneously identify whether said time frame portion encodes said at least one code word, over any one of said plurality of possible carrier frequencies;

c. determining a time index of said code word in the received signal based on said time frame portion of the received signal at which said code word is identified.

13. The method of claim 12 comprising identifying at least one code word in said communication frame and determine a time index at which said code word is encoded in the received signal and a carrier frequency over which said code word is encoded in the received signal.

14. The method of claim 12 wherein said analyzing comprises transforming said time frame portion to generate carrier-data including a plurality of carrier-data-pieces associated with each possible carrier frequency of said plurality of possible carrier frequencies respectively, whereby each of said carrier-data piece being indicative of data encoded in said time frame portion over a carrier frequency associated with said carrier-data piece; said convolving is performed simultaneously for the plurality of carrier-data-pieces.

15. The method of claim 12 comprising operating a plurality of n signal mixers for simultaneously processing the received signal, by applying a plurality of n respectively different predetermined frequency shifts to the received signal and thereby generate a plurality of n respectively different frequency shifted signals having their carrier frequencies shifted respectively by said different predetermined frequency shifts relative to said certain unknown carrier frequency of the received signal.

16. The method of claim 15 wherein said convolving comprises operation a plurality of at least n correlator modules for simultaneously convolving said plurality of frequency shifted signals respectively with said code word, to thereby generate at least n convolved signal representations indicative of whether said code words is encoded in said frequency shifted signals respectively.

17. The method of claim 16 wherein said at least n correlator modules comprises at least nXm correlator modules, whereby each group of m correlator modules of said nXm correlator modules is configured for simultaneously convolving a respective frequency shifted signal obtained by said respective one signal mixer with up to m code word simultaneously; thereby generating up to nXm convolved signal representations indicative of whether any one of said m code words is encoded in any one of said n frequency shifted signals respectively.

18. The method of claim 16 comprises comparing at least one convolved signal representation of said at least n convolved signal representations with a predetermined criteria and thereby to determine whether said code word is encoded in the frequency shifted signal corresponding to said convolved signal representation.

* * * * *